United States Patent
Ansari

(10) Patent No.: US 10,699,413 B1
(45) Date of Patent: Jun. 30, 2020

(54) AUTOMATIC IMAGE CROPPING SYSTEMS AND METHODS

(71) Applicant: CarMax Business Services, LLC, Richmond, VA (US)

(72) Inventor: Omar Ahmed Ansari, Richmond, VA (US)

(73) Assignee: CARMAX BUSINESS SERVICES, LLC, Richmond, VA (US)

(*) Notice: Subject to any disclaimer, the term of this patent is extended or adjusted under 35 U.S.C. 154(b) by 92 days.

(21) Appl. No.: 15/934,648

(22) Filed: Mar. 23, 2018

(51) Int. Cl.
*G06T 7/11* (2017.01)
*G06K 9/46* (2006.01)
*G06T 7/13* (2017.01)

(52) U.S. Cl.
CPC .............. *G06T 7/11* (2017.01); *G06K 9/4604* (2013.01); *G06T 7/13* (2017.01); *G06T 2207/20132* (2013.01)

(58) Field of Classification Search
CPC .............. G06T 3/40; G06T 2207/20021; G06T 2207/20132; G06T 7/70; G06T 3/00; G06T 7/187; G06T 7/32; G06T 7/337; G06T 3/608; G06T 2207/20076; G06T 2210/22; G06T 7/12; G06T 7/13; G06T 1/0007; G06T 2207/10004; G06T 7/11; G06T 2207/10024; G06T 7/33; G06T 7/38; G06T 2207/10016; G06T 7/194; G09G 5/14; G09G 2340/045; G06K 9/00234; G06K 9/32; G06K 9/4604; G06K 9/00664; G06K 9/00201; G06K 9/46; G06K 9/2063; G06K 9/6202; G06K 9/6255; G06K 9/66; G06K 9/036; G06K 9/48; H01L 31/049; H04N 1/3873; H04N 1/3878; H04N 19/176; H04N 19/172; H04N 19/55; H04N 19/51; H04N 19/105; H04N 19/11; H04N 19/56; H04N 5/23219; H04N 5/2258; H04N 5/332; A01B 69/008; G01C 11/025; A63F 2009/2425
USPC .......................... 382/137, 173, 270, 282, 283
See application file for complete search history.

(56) References Cited

U.S. PATENT DOCUMENTS

| | | | |
|---|---|---|---|
| 5,978,519 A | 11/1999 | Bollman et al. | |
| 7,133,571 B2 | 11/2006 | Cheatle | |
| 7,684,916 B2 * | 3/2010 | Wei ...................... | A01B 69/001 345/158 |
| 8,406,515 B2 | 3/2013 | Cheatle | |
| 8,442,348 B2 | 5/2013 | Fu | |

(Continued)

*Primary Examiner* — Aklilu K Woldemariam
(74) *Attorney, Agent, or Firm* — Troutman Sanders LLP; Christopher J. Forstner; John A. Morrissett

(57) ABSTRACT

A system includes one or more memory devices storing instructions, and one or more processors configured to execute the instructions to perform the steps of a method to automatically crop images. The system may convert a raw image into a grayscale image before applying an edge detection operator to the grayscale image to create an edge image. The system may then create a binary image based on the edge image, identify one or more contours in the binary image, and determine one or more contour bounding image areas surrounding the contour(s). Upon identifying contour bounding image area(s) having user-specified dimensional criteria, the system may determine a minimum bounded image area including those area(s), pad the minimum bounded image area, and crop the raw image based on the padded bounded area.

20 Claims, 20 Drawing Sheets
(4 of 20 Drawing Sheet(s) Filed in Color)

(56) References Cited

U.S. PATENT DOCUMENTS

| | | | |
|---|---|---|---|
| 8,849,058 B2* | 9/2014 | Kennedy | G06T 11/60 |
| | | | 382/274 |
| 8,963,960 B2 | 2/2015 | Gilra | |
| 9,105,102 B1* | 8/2015 | Walther | G06K 9/00624 |
| 9,613,427 B2 | 4/2017 | Chen et al. | |
| 9,736,332 B2 | 8/2017 | Shacham et al. | |
| 9,881,226 B1* | 1/2018 | Rybakov | G06K 9/46 |
| 2003/0152291 A1* | 8/2003 | Cheatle | G06K 9/32 |
| | | | 382/296 |
| 2005/0025387 A1* | 2/2005 | Luo | H04N 1/3875 |
| | | | 382/298 |
| 2005/0147322 A1* | 7/2005 | Saed | G06K 9/64 |
| | | | 382/284 |
| 2010/0045809 A1* | 2/2010 | Packard | H04N 5/2258 |
| | | | 348/222.1 |
| 2010/0054592 A1* | 3/2010 | Nanu | G06T 5/008 |
| | | | 382/167 |
| 2010/0111439 A1 | 5/2010 | Fu | |
| 2012/0268612 A1* | 10/2012 | Wang | G06K 9/00624 |
| | | | 348/207.1 |
| 2013/0016092 A1* | 1/2013 | Collins | A61B 8/0891 |
| | | | 345/419 |
| 2014/0092255 A1 | 4/2014 | Choiniere et al. | |
| 2014/0153646 A1* | 6/2014 | Yang | H04N 19/176 |
| | | | 375/240.12 |
| 2015/0003720 A1* | 1/2015 | Kwon | G06T 7/0004 |
| | | | 382/147 |
| 2015/0310300 A1* | 10/2015 | Hou | G06Q 30/0631 |
| | | | 705/26.7 |
| 2015/0310585 A1* | 10/2015 | Gupta | G06T 3/0025 |
| | | | 382/199 |
| 2015/0350673 A1* | 12/2015 | Hu | H04N 19/44 |
| | | | 375/240.12 |
| 2016/0125614 A1* | 5/2016 | Chen | G06T 7/13 |
| | | | 345/620 |
| 2016/0165241 A1* | 6/2016 | Park | H04N 19/103 |
| | | | 375/240.08 |
| 2017/0351708 A1* | 12/2017 | Lahmann | G06T 7/155 |

* cited by examiner

AUTOMATIC IMAGE CROPPING SYSTEMS AND METHODS

FIELD OF THE INVENTION

The present disclosure relates to systems and methods for automatic image cropping, and more particularly systems and methods for automatically cropping images to achieve a user-specified aspect ratio.

BACKGROUND

Image cropping can be used to accentuate subject matter, remove unwanted subject or irrelevant detail, improve framing, or change aspect ratio of a digital image (e.g., photograph, illustration, film, etc.). As the process for manually cropping images can be arduous, many photographers, graphic designers, and other users have turned to image editing computer systems to expedite the image cropping process. An image editing system can be useful to process a high volume of images. For example, many merchants provide images of a large quantity of goods to be sold over the Internet to attract customers to their location. It is desirable to present images of those goods in a standardized format to increase the marketability of the goods, avoid customer confusion about the products being sold, and increase brand and merchant recognition. While helpful in presenting images in a standardized format, existing image editing systems tend to require extensive user input (e.g., to ascertain the subject of an image) that limits the capability of those systems.

Accordingly, there is a need for improved systems and methods that expedite and automate the manual process of image cropping without requiring extensive user input or providing inadequate noise removal. Embodiments of the present disclosure are directed to this and other considerations.

SUMMARY

Disclosed embodiments provide systems and methods for automatic image cropping.

Consistent with the disclosed embodiments, an image cropping system may include one or more memory devices storing instructions, and one or more processors configured to execute the instructions to perform the steps of a method to automatically crop images. The system may execute the instructions to convert an uncropped raw image into a grayscale image before applying an edge detection operator to the grayscale image to create an edge image. The edge image may have one or more edge image regions corresponding to one or more features corresponding to an image subject in the raw image. The system may then create a binary image from the edge image, and the binary image may have one or more binary image regions associated with the one or more edge image regions. The system may then identify one or more contours in the binary image, and determine one or more contour bounding image areas surrounding the contour(s). Each contour may be associated with a respective one of the binary image region(s). Upon identifying contour bounding image area(s) having user-specified dimensional criteria, the system may determine a minimum bounded image area including those area(s) and pad the minimum bounded image area to determine a padded bounded image area having a user-specified aspect ratio. The system may then crop the raw image based on the padded bounded area to produce a cropped raw image of the image subject with the user-specified aspect ratio.

Consistent with the disclosed embodiments, methods for automatically cropping images are also disclosed.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings:

FIGS. 8B and 9B are a grayscale image derived from the raw image shown in FIGS. 8A and 9A in accordance with an exemplary embodiment;

FIGS. 8C and 9C are an edge image version derived from the grayscale image shown in FIGS. 8B and 9B in accordance with an exemplary embodiment;

FIGS. 8D and 9D are a binary image version derived from the edge image shown in FIGS. 8C and 9C having a minimum bounded image area in accordance with an exemplary embodiment;

FIGS. 8E and 9E are the raw image shown in FIGS. 8A and 9A having the minimum bounded image area and a padded area to achieve a user-specified aspect ratio in accordance with an exemplary embodiment;

FIGS. 8F and 9F are a cropped version of the raw image shown in FIGS. 8A and 9A having the user-specified aspect ratio in accordance with an exemplary embodiment.

DETAILED DESCRIPTION

Figure 1:
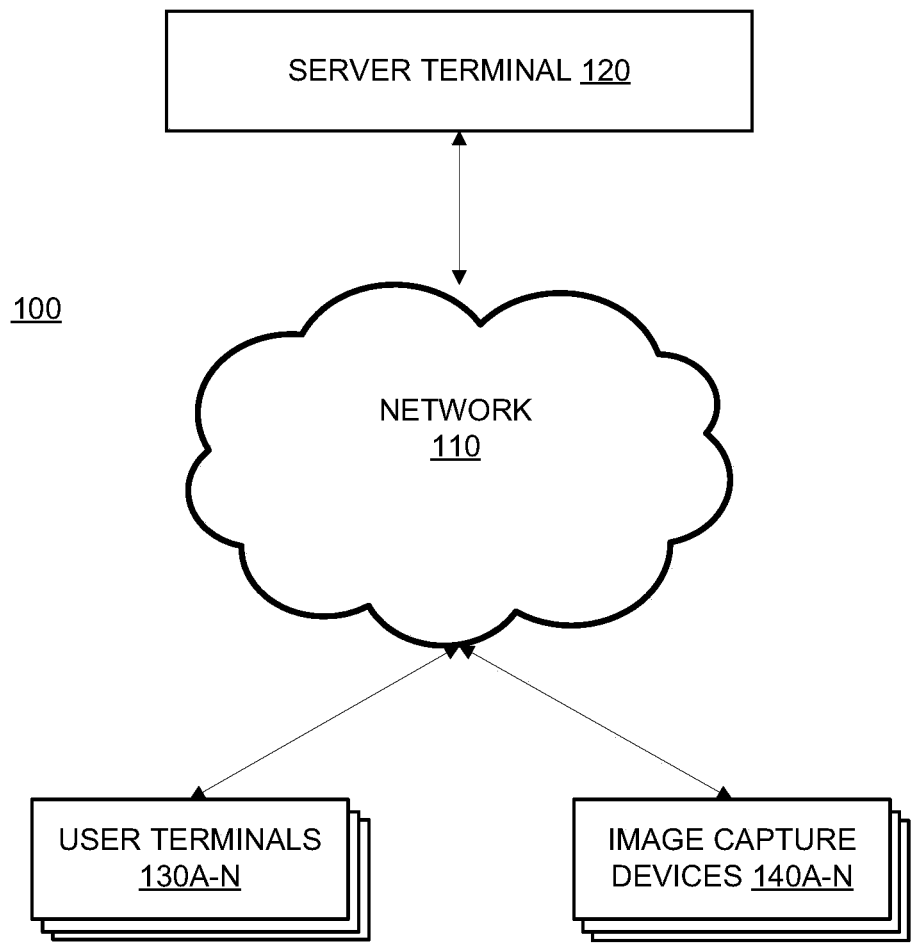
FIG. 1 is a diagram of an automatic image cropping system according to an exemplary implementation of the disclosed technology.

Example implementations of the disclosed technology can provide systems and methods for automatically cropping raw images without extensive human input. For example, some implementations utilize digital image processing techniques and thus enable expedited or even automated image cropping. According to example implementations, a computing device (e.g., a user device) may receive a captured image, which may be unmodified (i.e., a raw image) or modified into a grayscale or edge version of the raw image. The system may receive certain user-specified parameters that will be applied during image processing. Based on the specified parameters, the system can transform the captured image from a raw image to a binary image. In some embodiments, the system may receive a captured image as a grayscale image or an edge image, which the system may transform into a binary image. The system may analyze the binary image for features defined by contours. The system defines a contour as a curve comprising a boundary of a feature in an image. Contours may connect contiguous pixels in a binary image, wherein each pixel that comprises the contour has the same image gradient value and therefore an equivalent image pixel intensity as each other pixel in the contour, resulting in a set of at least one or more contours associated with a feature in the binary image, corresponding to features located in the unmodified (raw) input image. The system may determine at least one contour bounding image area, with each contour bounding area surrounding one or more of the identified contours. The system defines a contour bounding image area as a boundary that completely circumscribes an identified contour. The system may identify the contour bounding image areas that fit user-specified dimensional criteria, and determine a minimum bounded image that includes all of the identified contour bounding image areas. Further, the system may pad the minimum bounded image area with pixels to customize the aspect ratio to a user-defined configuration. Finally, the system may crop the raw image based on the padded minimum bounded image area to produce a raw image of the image subject with the user-specified aspect ratio. In some embodiments, the resultant raw image of the image subject may be compressed in comparison to the original image, thereby improving a computer network's functionality when communicating the resultant cropped raw image from one of a plurality of user terminals to a central server terminal. Whether smaller due to being cropped or cropped and compressed, the resultant image may improve the computer network's functionality by reducing bandwidth requirements to employ the system and decreasing transmission times. In a further aspect of the invention, user-specified dimensional criteria may be pre-determined according by analyzing the binary edge image for areas of high concentration of bounding rectangles or bounding rectangles that exceed pre-determined dimensions (e.g., high number and/or large bounding rectangles positioned along the top of a background wall behind a subject) and setting a threshold based on the size of these bounding rectangles known not to correspond to features of the image subject.

In another aspect, a method for automatically cropping images is disclosed. The method may include receiving, at a processor and from a computing device, an image file having data representative of a photographed object. The method may also include converting a raw image into a grayscale image and transforming the grayscale image into an edge image using an edge detection algorithm, such as, but not limited to, a Sobel edge detector. The edge image may contain edge objects surrounded by contours, which may be defined by contiguous points joining pixels of the same image intensity value, and the edge image regions may correlate to features found in the raw input image. In some embodiments, an image region may include a grouping of contiguous image pixels, or a group of pixels adjacent from one-to-another. The method may further include applying a user-specified binary threshold to the edge image in order to separate unwanted noise artifacts in the image from the binary image regions that correlate to features in the raw image. Similar to the edge image regions, the binary image regions may be considered to be a grouping of contiguous image pixels. The method may also include detecting contours found in the binary image corresponding to features in the raw image. The contours may comprise curves joining contiguous points of the same image intensity, and then circumscribing the contours collectively by a minimum bounded image area to capture all contours within the minimum bounded image area. The minimum bounded image area may correspond to a portion of the raw image which will contain the image subject. The method may also include padding the minimum bounded image area with pixels to conform to the user-specified aspect ratio, and cropping the raw image based on the padded minimum bounded image area to produce a resulting cropped raw image having a standardized aspect ratio and containing the image subject.

In another embodiment of the invention, a method for automatically cropping a set of images is disclosed. The method may determine a minimum bounded image area for an exemplary raw image in a set of related raw images, and may use the determined minimum bounded image area of the exemplary raw image to produce cropped raw images having a standardized aspect ratio and containing the image subject. In a further aspect of the invention, the system is optimized to operate in a photo studio having components of the system, and calibrated based on features in such studio (e.g., the color levels of background wall(s) and floor, the lighting intensity and color temperature, and the distance of the camera from the image subject).

The method, in some example implementations, may further include additional step(s), such as identifying contour bounding image areas following the detection of the contours in the binary image. Desirable contour bounding image areas may be detected by implementing user-specified dimensional criteria, including, for example, both a horizontal upper dimension and a vertical lower dimension in order to filter out unwanted noise from desirable contour bounding image areas corresponding to features in the raw image. Following the detection of the contour bounding image areas of user-specified dimensional-criteria, a minimum bounded image area may collectively enclose all of the selected contour bounding image areas. The minimum bounded image area may be padded and the image aspect ratio converted according to user-specification. The method may also include cropping the raw image based on the padded bounded area to produce a cropped raw image of the image subject with the user-specified aspect ratio. The detection of contour bounding image areas may serve the purpose of further eliminating noise and other unwanted features from affecting the auto-cropping system, so that only objects that are features of the image subject in the raw image are used in determining the proper cropping area.

In yet another aspect, a non-transitory computer readable memory containing program instructions causing a computer to perform a method for automatically cropping images is disclosed. The non-transitory computer readable memory may contain instructions that, when executed by one or more processors, may cause the computer to perform the steps of a method for automatic image cropping. For example, method performed by the computer may include receiving a captured image, which may be unmodified (i.e., a raw image) or modified into a grayscale or edge version of the raw image. The method may allow a user to specify certain parameters that will be applied during image processing. Based on the specified parameters, the method may transform the captured image from a raw image to a binary image. In some embodiments, the method may include receiving a captured image in either grayscale or edge format, which the computer may transform into a binary image. The method may also include analyzing the binary image for features defined by contours, defined as a curve comprising a boundary of a feature in an image. Contours may connect contiguous pixels in a binary image, wherein each pixel that comprises the contour has the same image gradient value and therefore an equivalent image pixel intensity as each other pixel in the contour, resulting in a set of at least one or more contours each surrounding a feature in the binary image, corresponding to features located in the unmodified (raw) input image. The method may further include determining at least one contour bounding image area wherein each contour bounding area surrounds each identified contour, with a contour bounding image area including a boundary that completely circumscribes an identified contour. The method may also include identifying the contour bounding image areas that fit user-specified dimensional criteria, and determining a minimum bounded image that includes all of the identified contour bounding image areas. Further, the method may include padding the minimum bounded image area with pixels to customize the aspect ratio to a user-defined configuration. Finally, the method may include cropping the raw image based on the padded minimum bounded image area to produce a cropped raw image of the image subject with the user-specified aspect ratio.

The exemplary systems, methods, and computer-readable media disclosed herein may provide numerous advantages. Notably, they may function with little user input, and provide image results that are standardized to increase the marketability of the goods, avoid customer confusion about the products being sold, and increase brand and merchant recognition. Additionally, they may provide improved noise removal and cure other defects in the resulting image.

Reference will now be made in detail to exemplary embodiments of the disclosed technology, examples of which are illustrated in the accompanying drawings and disclosed herein. Wherever convenient, the same reference numbers will be used throughout the drawings to refer to the same or like parts.

FIG. 1 is a diagram of an automatic image cropping system according to an exemplary implementation of the disclosed technology. The components and arrangements shown in FIG. 1 are not intended to limit the disclosed invention as the components used to implement the disclosed processes and features may vary. In accordance with the disclosed embodiments, an automatic image cropping system 100 may include a server terminal 120, which may serve as a central node between other nodes, in communication with a plurality of user terminals 130A-N and image capture devices 140A-N via a network 110. While it is appreciated the disclosed image cropping system 100 may include a plurality of user terminals (e.g., N number of user terminal nodes) and image capture devices (e.g., N number of image capture devices), hereinafter reference will be made to user terminal 130 and image capture device 140. In some embodiments, user terminal 130 and image capture device 140 may comprise a combined device, such as a mobile computing device with image capture capabilities, or a smartphone configured to operate the disclosed image cropping methods.

Figure 2:
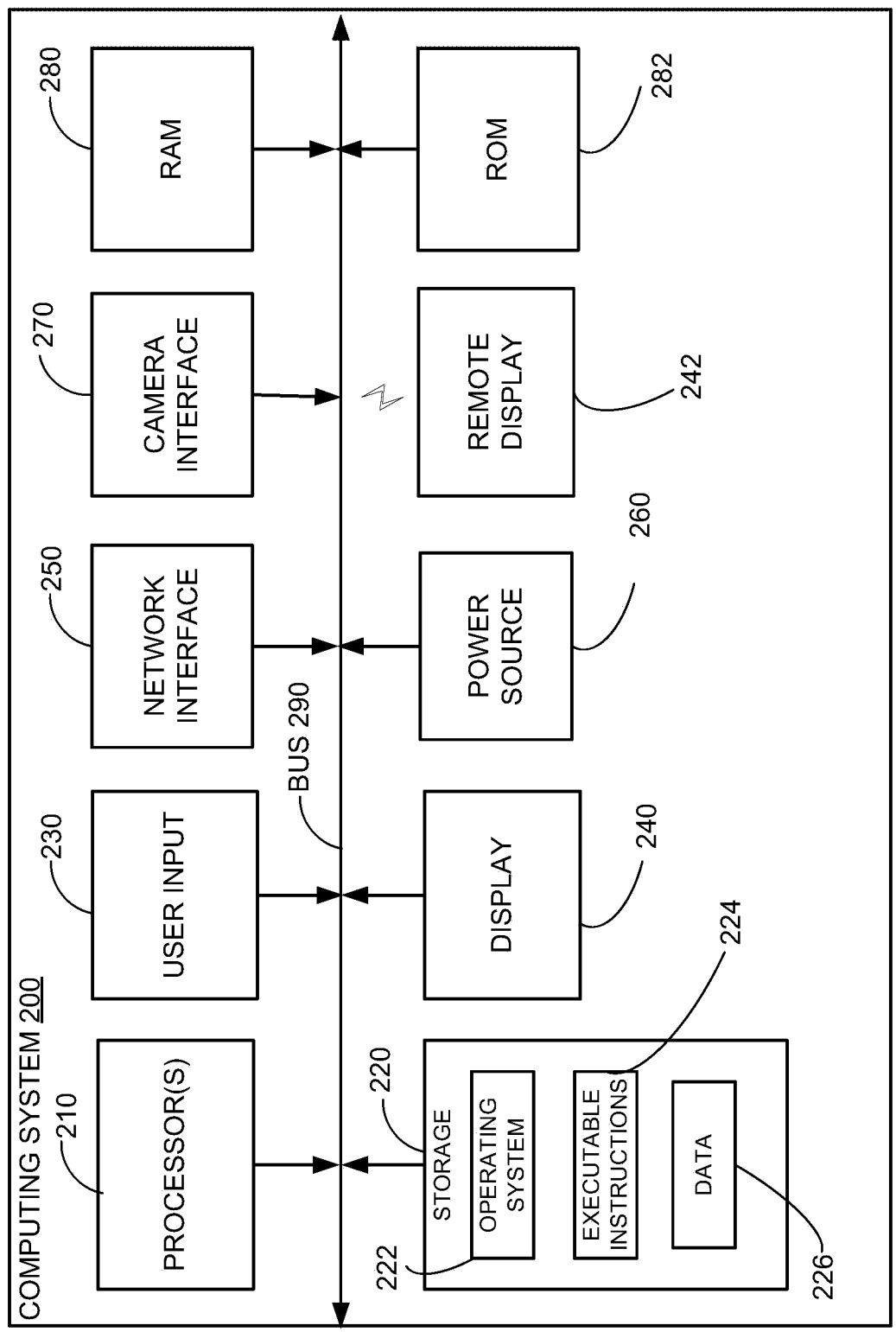
FIG. 2 depicts a computing system architecture according to an exemplary implementation of the disclosed technology.

Server terminal 120 and user terminal 130 may each include one or more mobile computing devices (e.g., tablet computers or portable laptop computers) or stationary computing devices (e.g., stationary desktops), and have components and functionalities as described in more detail with respect to FIG. 2.

Network 110 may be of any suitable type, including individual connections via the internet such as cellular or WiFi networks. In some embodiments, network 110 may connect terminals using direct connections such as radio-frequency identification (RFID), near-field communication (NFC), Bluetooth®, low energy Bluetooth® (BLE), WiFi™, ZigBee®, ambient backscatter communications (ABC) protocols, USB, or LAN.

Image capture device 140 may be of any suitable type, including, for example, a digital camera utilizing either a charge-coupled device (CCD) imager or complimentary metal-oxide semiconductor (CMOS) imager, without limitation. Image capture device 140 may communicate with the user terminal 130 and/or server terminal 120 via the network 110.

In some embodiments, one or more of the automatic image cropping (or autocropping) methods disclosed herein to be performed in part or entirely by one or more of user terminal 130 (e.g., first node) and server terminal 120 (e.g., central node). For example, in some embodiments, user terminal 130 (e.g., first node) may perform most or all of the image processing steps before transmitting the cropped version of the raw image having the user-specified aspect ratio for storage and/or display elsewhere in system 100 or on a system or device in communication with system 100. Similarly, in other embodiments, server terminal 120 (e.g., central node) may perform most or all of the image processing steps after receiving the raw image directly from image capture device or indirectly via user terminal 130 before transmitting the cropped version of the raw image having the user-specified aspect ratio for storage and/or display elsewhere in system 100 (e.g., user terminal 130) or on a system or device in communication with system 100. In further embodiments, user terminal 130 and server terminal 120 may each perform some of the image processing steps. Both user terminal 130 and server terminal 120 may comprise more or fewer of the components disclosed in FIG. 2, enabling both the user terminal 120 and the server terminal 110 to perform the steps of an image cropping method. In certain embodiments, it is preferred that user terminal 130 perform the image processing steps before transmitting the modified version of the raw image because having the modified image saves valuable computational power and network bandwidth of system 100, which may be processing a multitude of image cropping requests from a plurality of user-terminal nodes 130.

A computing device architecture 200 is illustrated in FIG. 2, and implementations of the disclosed technology may include a computing device with more or fewer components than those shown. It will be understood that computing device architecture 200 is provided for example purposes only and does not limit the scope of the various implementations of the present disclosed systems, methods, and computer-readable mediums.

As shown, computing device architecture 200 may include a central processing unit (CPU) 210, where computer instructions may be processed; a display interface 240 that supports a graphical user interface and provides functions for rendering video, graphics, images, and texts on the display. In certain example implementations of the disclosed technology, display interface 240 may connect directly to a local display, such as a desktop monitor. In another example implementation, display interface 242 may be configured for providing data, images, and other information for an external/remote display that is not necessarily physically connected to the mobile computing device. For example, a desktop monitor may be utilized for mirroring graphics and other information that is requested from remote server. In certain example implementations, display interface 242 wirelessly communicates, for example, via a Wi-Fi channel, Bluetooth connection, or other available network connection interface 250 to the external/remote display.

In an example implementation, network connection interface 250 may be configured as a wired or wireless communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, another like communication interface, or any combination thereof.

Computing device architecture 200 may include a user input 230 that provides a communication interface to a physical or virtual keyboard. Computing device architecture 200 may be configured to use one or more input components via one or more of input/output interfaces (for example, keyboard interface 230, display interface 240, network connection interface 250, a camera interface 270, etc.) to allow computing device architecture 200 to present information to a user and capture information from a device's environment including instructions from the device's user. The input components may include a mouse, a trackball, a directional pad, a track pad, a touch-verified track pad, a presence-sensitive track pad, a presence-sensitive display, a scroll wheel, a digital camera, a digital video camera, a web camera, and the like. Additionally, an input component may be integrated with the computing device architecture 200 or may be a separate device.

In example implementations, network connection interface 250 may support a wireless communication interface to a network (e.g., network 110). As mentioned above, display interface 240 may be in communication with network connection interface 250, for example, to provide information for display on a remote display 242 that is not directly connected or attached to the system. In certain implementations, camera interface 270 may be provided that acts as a communication interface and provides functions for capturing digital images from a camera. According to example implementations, a random access memory (RAM) 280 may be provided, where computer instructions and data may be stored in a volatile memory device for processing by the processor(s) 210.

According to example implementations, computing device architecture 200 may include a read-only memory (ROM) 282 where invariant low-level system code or data for basic system functions such as basic input and output (I/O), startup, or reception of keystrokes from a keyboard may be stored in a non-volatile memory device. According to example implementations, computing device architecture 200 may include a storage medium 220 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), for storing files including an operating system 222, application programs (including, for example, a web browser application, a widget or gadget engine, and or other applications, as necessary), executable instructions 224 (including stored programs that enable various operations of the method such as a Sobel operator, grayscale transformation, binary transformation, and bounded area detection routines as disclosed in, e.g., system 300), and data files 226, which may include image files representative of received images to be cropped. According to example implementations, computing device architecture 200 may include a power source 260 that may provide an appropriate alternating current (AC) or direct current (DC) to power components.

According to an example implementation, processor 210 may have appropriate structure to be a computer processor. In one arrangement, processor 210 may include more than one processing unit. RAM 280 may interface with a computer bus 290 to provide quick RAM storage to the processor 210 during the execution of software programs such as the operating system, application programs, and device drivers. More specifically, processor 210 may load computer-executable process steps from storage medium 220 or other media into a field of RAM 280 to execute software programs. Data may be stored in RAM 280, where computer processor 210 may access data during execution. In one example configuration, and as will be understood by one of skill in the art, computing device architecture 200 may include sufficient RAM and flash memory for carrying out processes relating to the disclosed technology.

Storage medium 220 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media may allow a computing device to access computer-executable process steps, application programs and the like, stored on removable and non-removable memory media, to offload data from the device or to upload data onto the device. A computer program product, such as one utilizing an image cropping system, may be tangibly embodied in storage medium 220, which may include a non-transitory, machine-readable storage medium.

According to example implementations, the term "computing device," as used herein, may be a processor, or conceptualized as a processor (for example, processor 210 of FIG. 2). In such example implementations, the computing device (processor) may be coupled, connected, and/or in communication with one or more peripheral devices, such as display 240.

In example implementations of the disclosed technology, a computing device includes any number of hardware and/or software applications that are executed to facilitate any of the operations. In example implementations, one or more user input interfaces 230 may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, etc., may facilitate user interaction with the computing device. The one or more user input interfaces 230 may be utilized to receive or collect data and/or user instructions from a wide variety of input devices. Received data may be processed by one or more computer processors 210 as desired in various implementations of the disclosed technology and/or stored in one or more memory devices, such as storage medium 220.

One or more network interfaces 250 may facilitate connection of the computing device inputs and outputs to one or more suitable networks and/or connections. For example, the connections that facilitate communication with any number of sensors associated with the system. The one or more network interfaces 250 may further facilitate connection to one or more suitable networks; for example, a local area network, a wide area network, the Internet, a Wi-Fi enabled network, a satellite-based network, any wired network, any wireless network, etc., for communication with external devices and/or systems.

Figure 3:
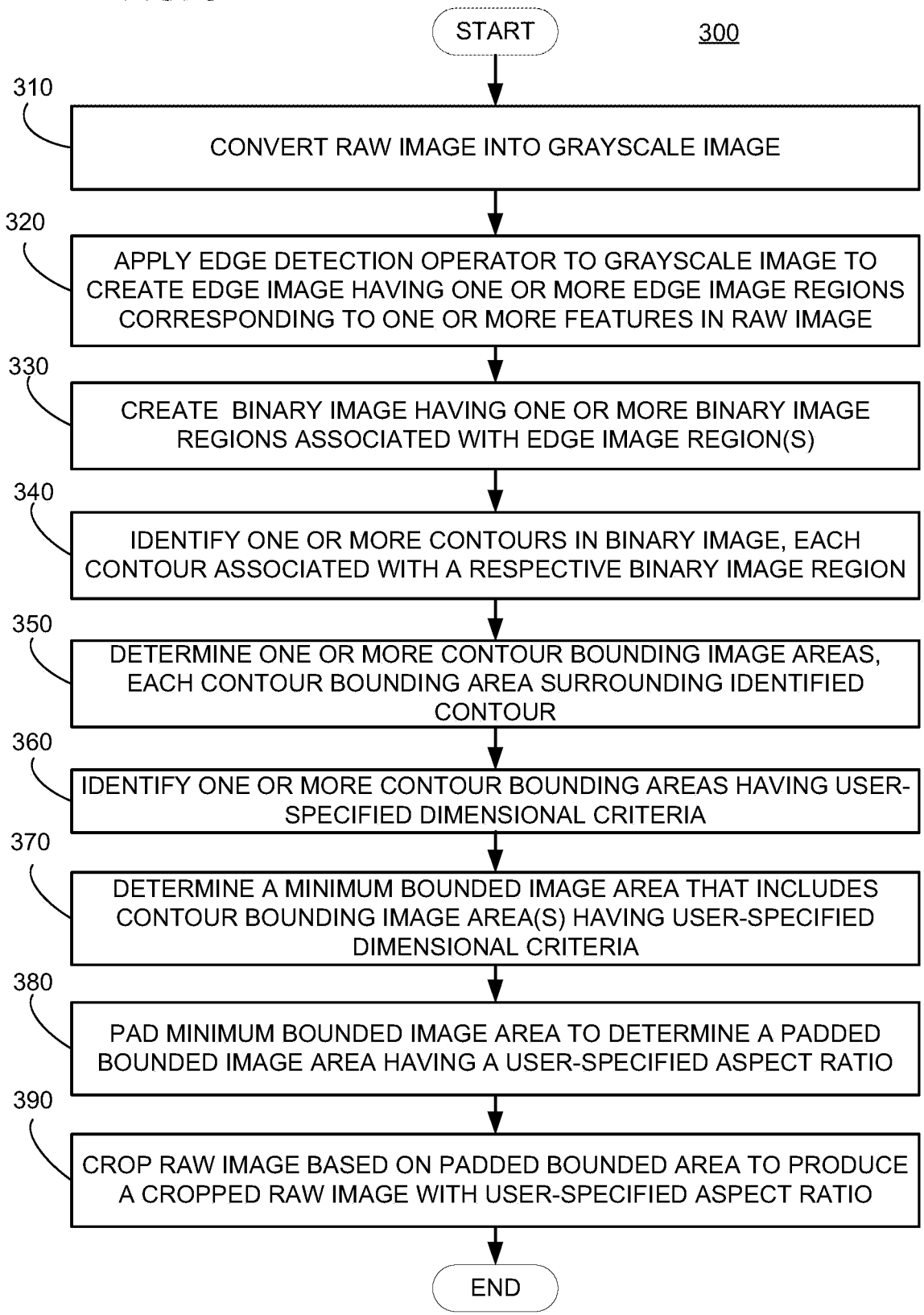
FIG. 3 is a flowchart of an exemplary method for automatic image cropping.
Figure 8A:
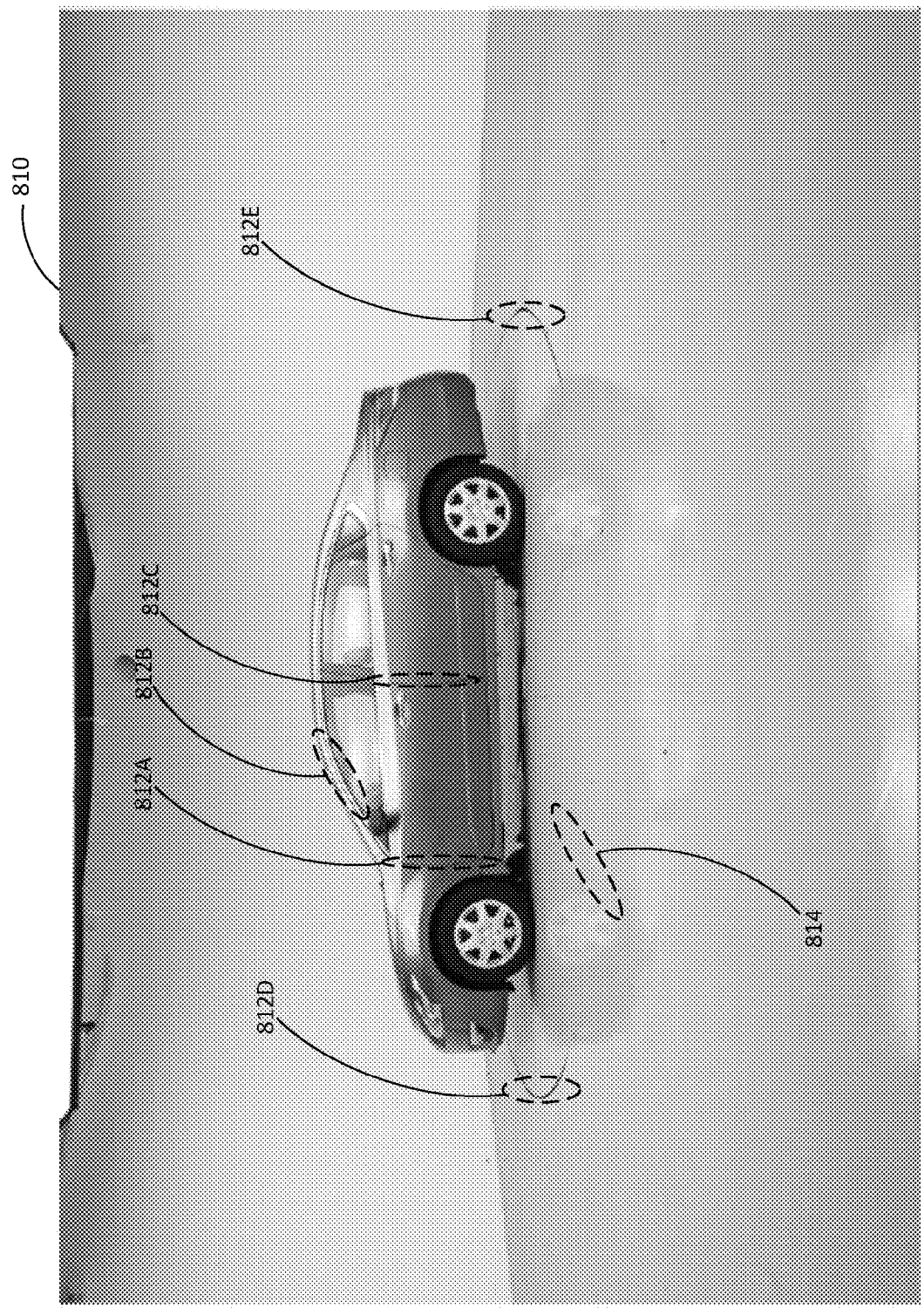
FIGS. 8A-8F and 9A-9F show the various stages of an exemplary raw image, shown in FIGS. 8A and 9A, as an exemplary system performs the autocropping method in accordance with an exemplary embodiment.
Figure 8B:
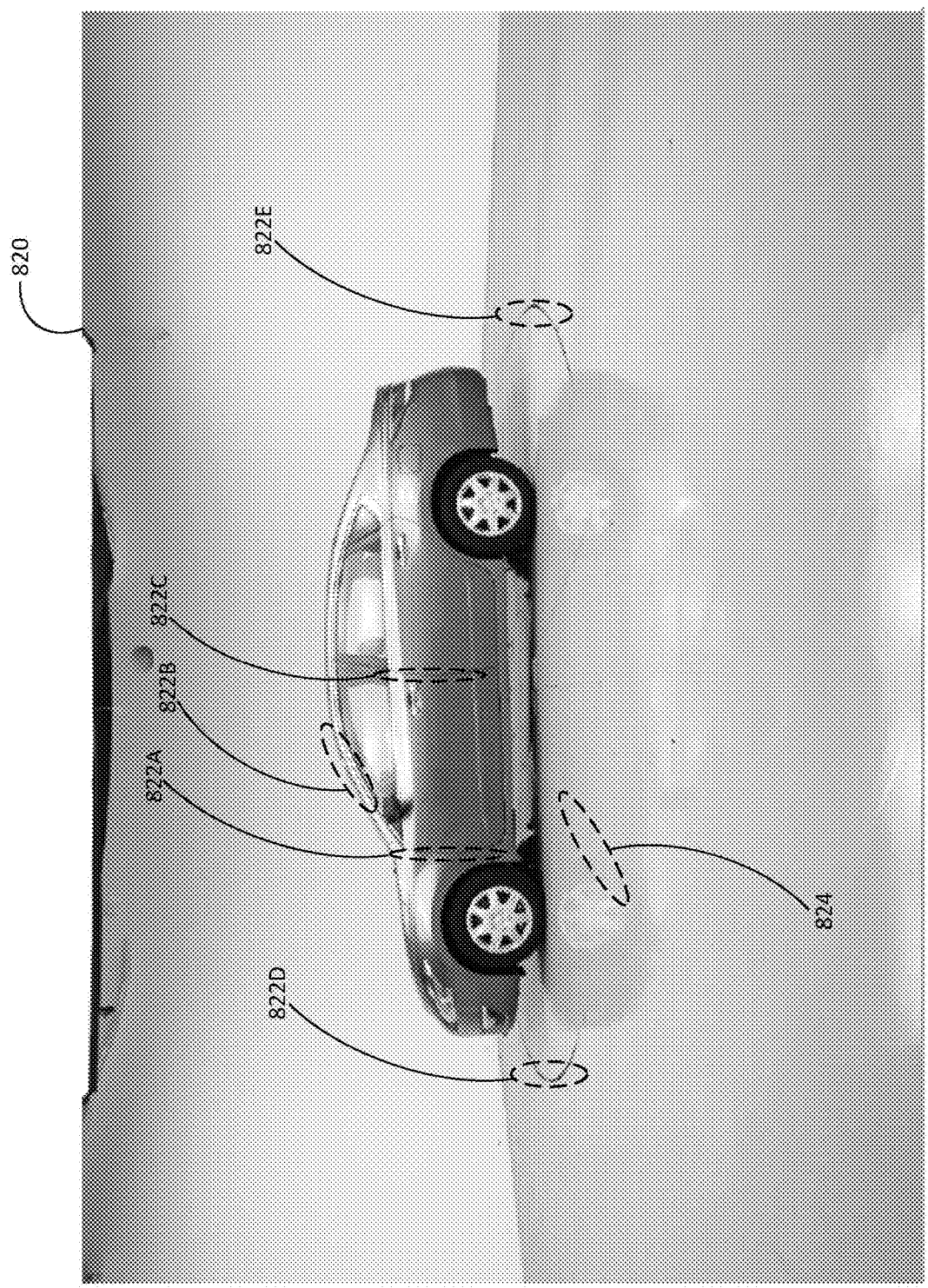

FIG. 3 is a flowchart of an exemplary method for automatic image cropping 300. In step 310 of method 300, the system (e.g., system 100 or, more specifically, one or more of server terminal 120 and user terminal 130 having one or more components of computing device architecture 200) may convert a raw image into a grayscale image. For example, this step may be performed either by user terminal 130 or by server terminal 120, after image capture device 140 transmits a captured raw image (e.g., a captured raw image 810 as shown in FIG. 8A) to either server terminal 120 or user terminal 130. The system may process the image to convert the raw image into a grayscale image (e.g., a grayscale image 820 as shown in FIG. 8B). In an exemplary embodiment, a grayscale image may be generated from a raw image by measuring the red, green, and blue values of each pixel in the raw image, averaging the values of red, green, and blue pixels to obtain a gray value (simple or weighted average methods), which may be used to replace the original red, green, and blue, values found in the raw image. Other methods of obtaining a grayscale image from a raw input image, such decomposition and desaturation, are also contemplated.

In a distributed environment with multiple nodes, step 310 may be performed locally by one of a plurality of user terminal nodes 130 before sending the resultant image to server terminal 120 for display via network 110. Alternatively, all steps of method 300 may first be performed on a local node such as user terminal 130 before transmitting the resultant image to server terminal 120 for display via network 110. Such a distributed system offers many advantages, including increasing the system's efficiency and lowering computational costs.

Figure 8C:
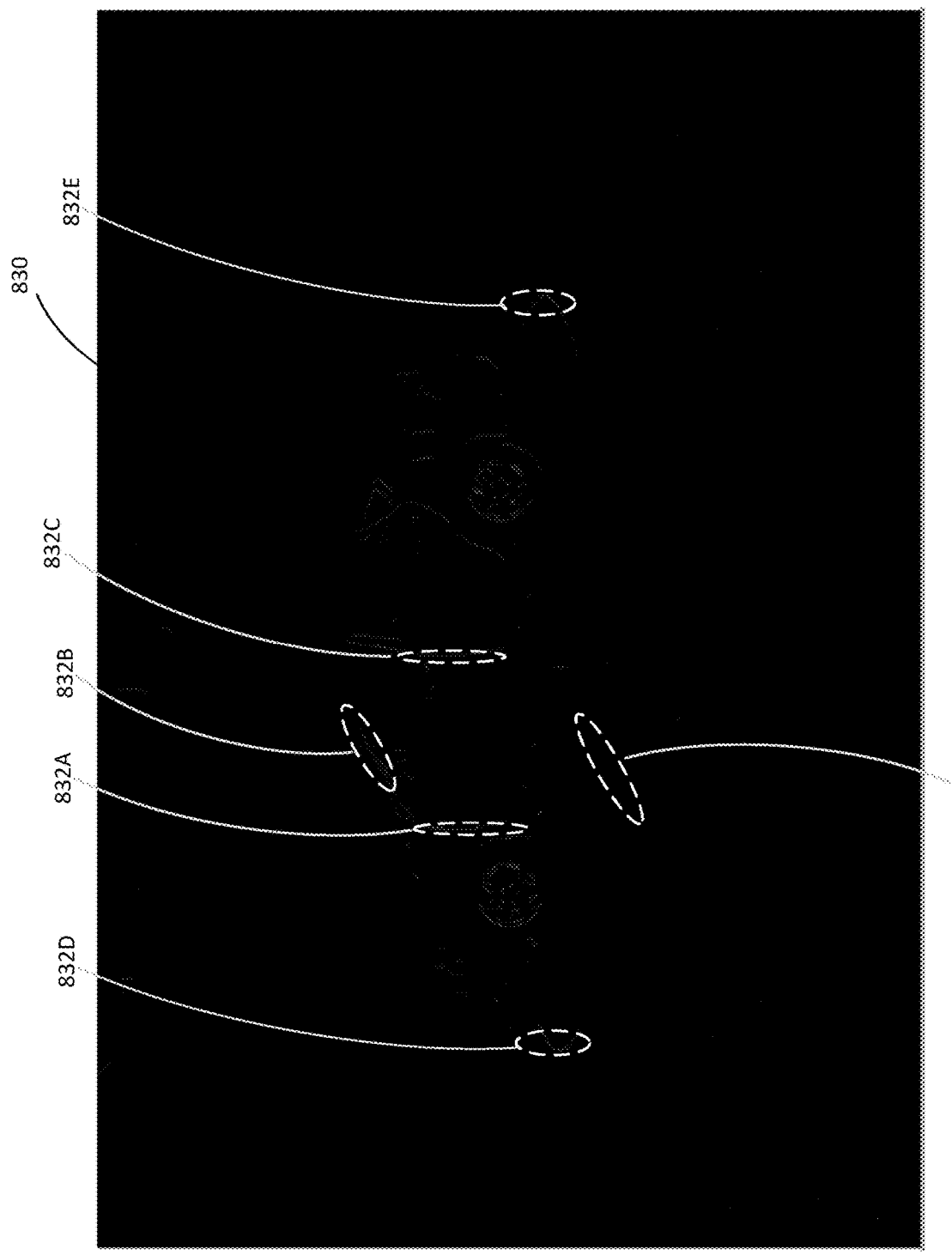

The system may further transform the grayscale image into an edge image (e.g., an edge image 830 as shown in FIG. 8C) using an edge detection algorithm in step 320 of method 300, again utilizing either one or more of user terminal 130 and server terminal 120. The system may, for example and without limitation, use a Sobel edge operator to create an edge image having highlighted edges based on the grayscale image. A Sobel edge operator performs a 2-D spatial gradient measurement on an image (e.g., at each pixel) and emphasizes regions of high spatial frequency that correspond to edges. In some embodiments, the Sobel edge operator consists of a pair of 3×3 convolution kernels, wherein one kernel is the other rotated by 90 degrees, with the kernels designed to respond maximally to edges running vertically and horizontally relative to the pixel grid. The kernels can be applied separately to the input image to produce separate measurements of the gradient component in each orientation (i.e., $G_x$ and $G_y$). These components may be combined together to find the absolute magnitude of the gradient at each point and the orientation of that gradient. As shown in FIG. 8C, edge image 830 may contain one or more edge image regions 832 corresponding to one or more features 812 in the raw image 810 shown in FIG. 8A. Edge image regions 832 may have features corresponding to the image subject of raw image 810, which will be identified in method 300, as well as other artifacts in the image that may be due to a photo studio or other physical environment surrounding the image subject.

Figure 8D:
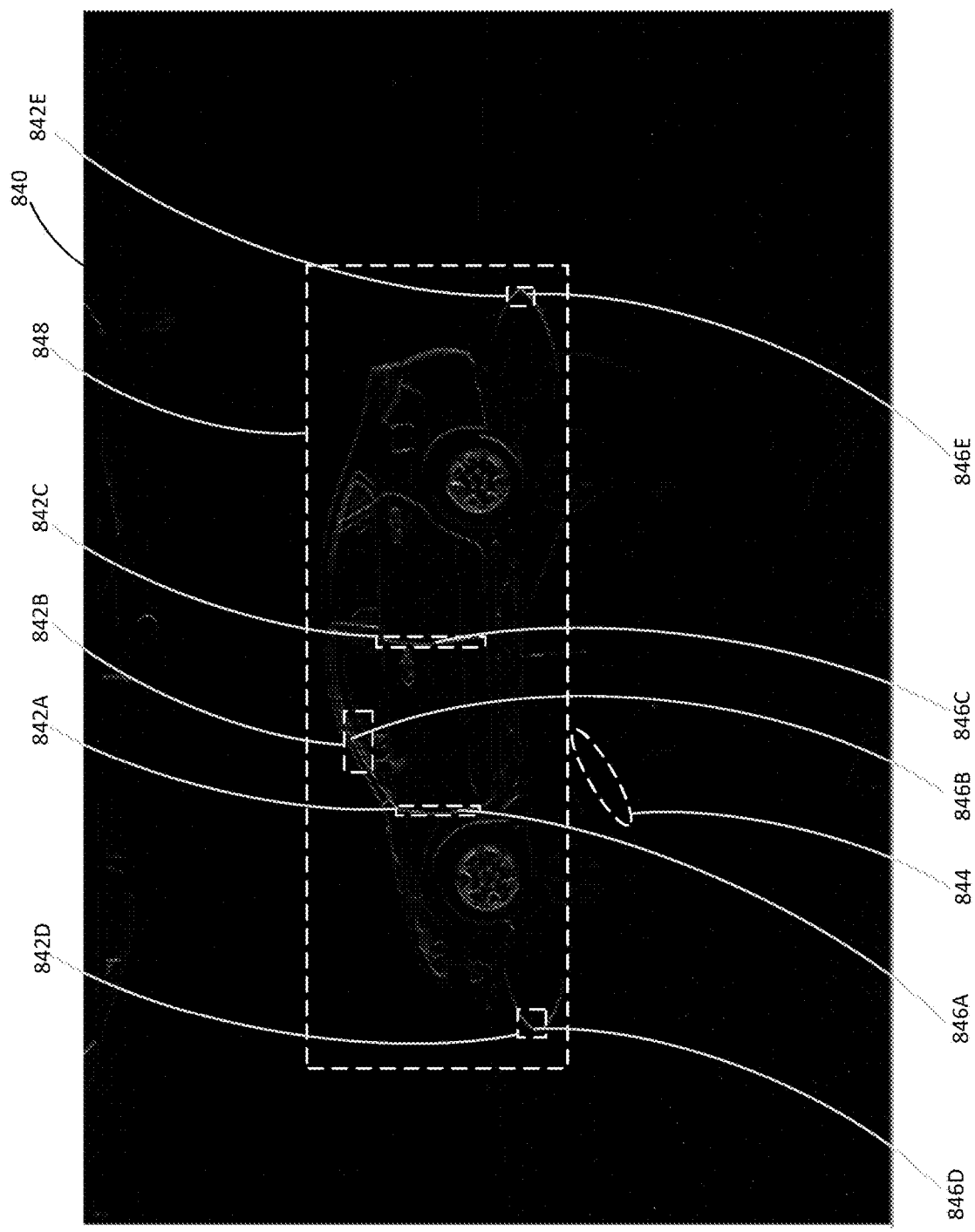

Further, the system may create a binary image (e.g., a binary image 840 as shown in FIG. 8D) based on the edge image in step 330 of method 300. A binary image is a digital image that has only two possible values for each pixel, such as black and white. Binary image 840 may have one or more binary image regions associated with the edge image regions in the edge image, the edge regions corresponding to one or more features 812 in the raw image. The system associates a binary image region with an edge image region whenever the image regions have the same pixel coordinates, and the system identifies an edge image region corresponding to one or more features in the raw image when the edge image region contains an edge that comprises some identifying feature of the image subject (e.g. a door jamb of a car, or the spokes of its wheel). Creating a binary image in step 330 may reduce image cropping errors by strengthening the edges in the edge image and removing weak edges (e.g., a weak edge 824 as shown in FIG. 8B) that fall below a user-selected threshold. A binary image comprises only two possible pixel values which may be either full intensity or an intensity of zero. Weak edges are less likely to correlate to features in the raw image 810 than strong edges, and therefore their removal reduces image cropping errors. Weak edges may represent edges in the edge image that fall below a predetermined threshold value. Their removal enhances clarity of the resultant binary image because weak edges typically do not correspond to features in the raw image (e.g. a door jamb of a car, or the spokes of its wheel). Creating the binary image in step 330 also enhances strong edges by setting their pixel value to the maximum, thereby improving the system's ability to identify image regions that correlate to features of the image subject in the raw image 810.

The system may also identify one or more contours (e.g., a contour 846, as shown in FIG. 8D) in the binary image in step 340 of method 300, with each contour being associated with one of the binary image regions. The system defines a contour as a curve comprising a boundary of a feature in an image. Contours may connect contiguous pixels in a binary image, with each pixel in a particular contour having the same image gradient value, and an equivalent image pixel intensity as other pixels making up the contour. For example, an image cropping system (e.g., system 100) may identify a curve connecting points of the same image intensity as a contour.

The system may further determine one or more contour bounding image areas (e.g., a contour bounding area 842, as shown in FIG. 8D) in step 350 of method 300, with each contour bounding image area surrounding one of the one or more identified contours of step 340. Based on the contour bounding image areas, the system may be able to determine the image cropping area with less computational expense. In some embodiments, the contour bounding image areas may include a minimum bounded rectangle. The use of a minimum bounded rectangle saves valuable computational power by reducing the complexity of the shape the system needs to analyze to determine the proper cropping area.

Further, use of a minimum bounded rectangle saves development time and costs as developers can more easily work with simple shapes compared to more complex ones, and may lead to reductions in development time and in software bugs.

Figure 8E:
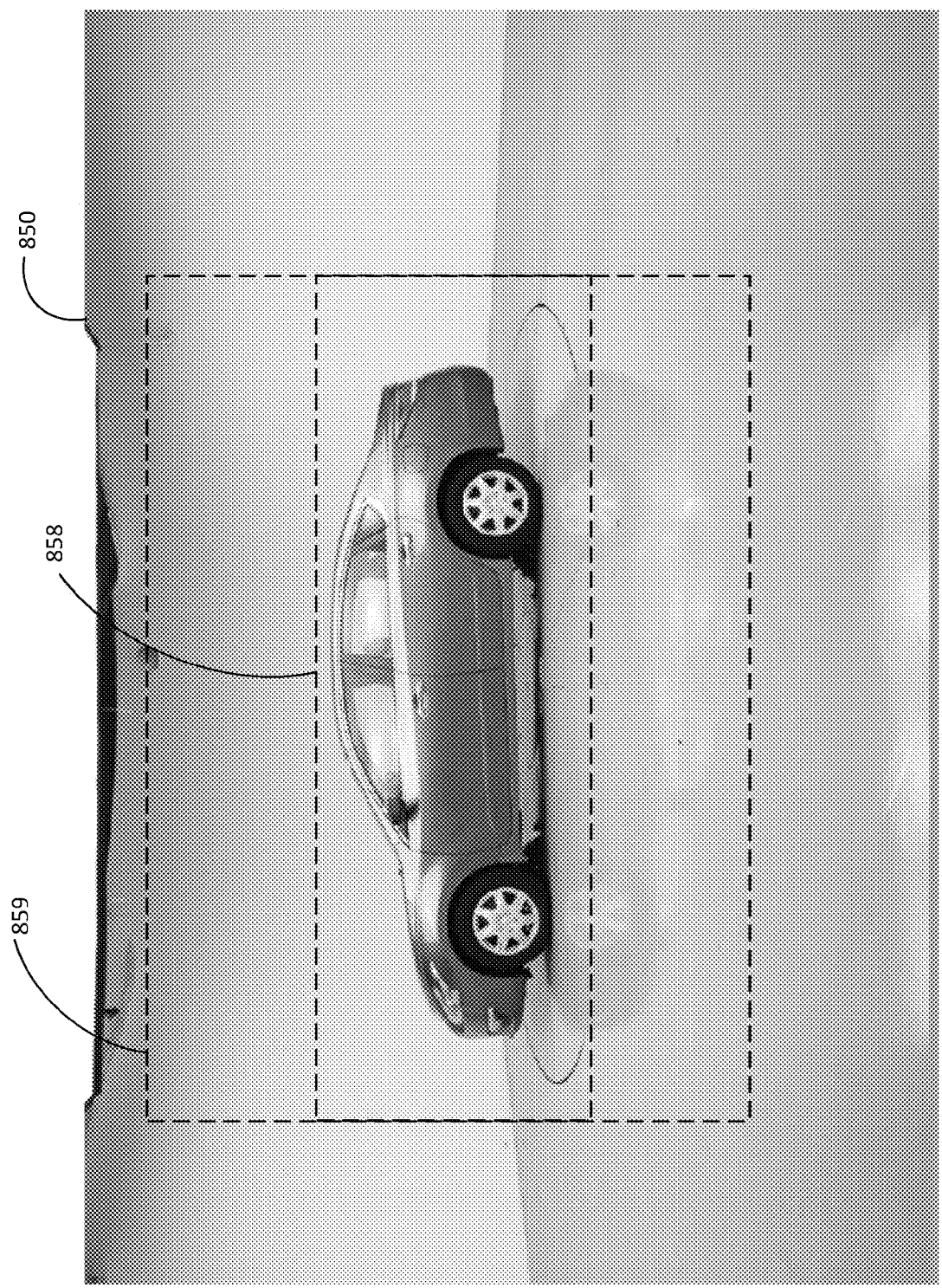
Figure 10:
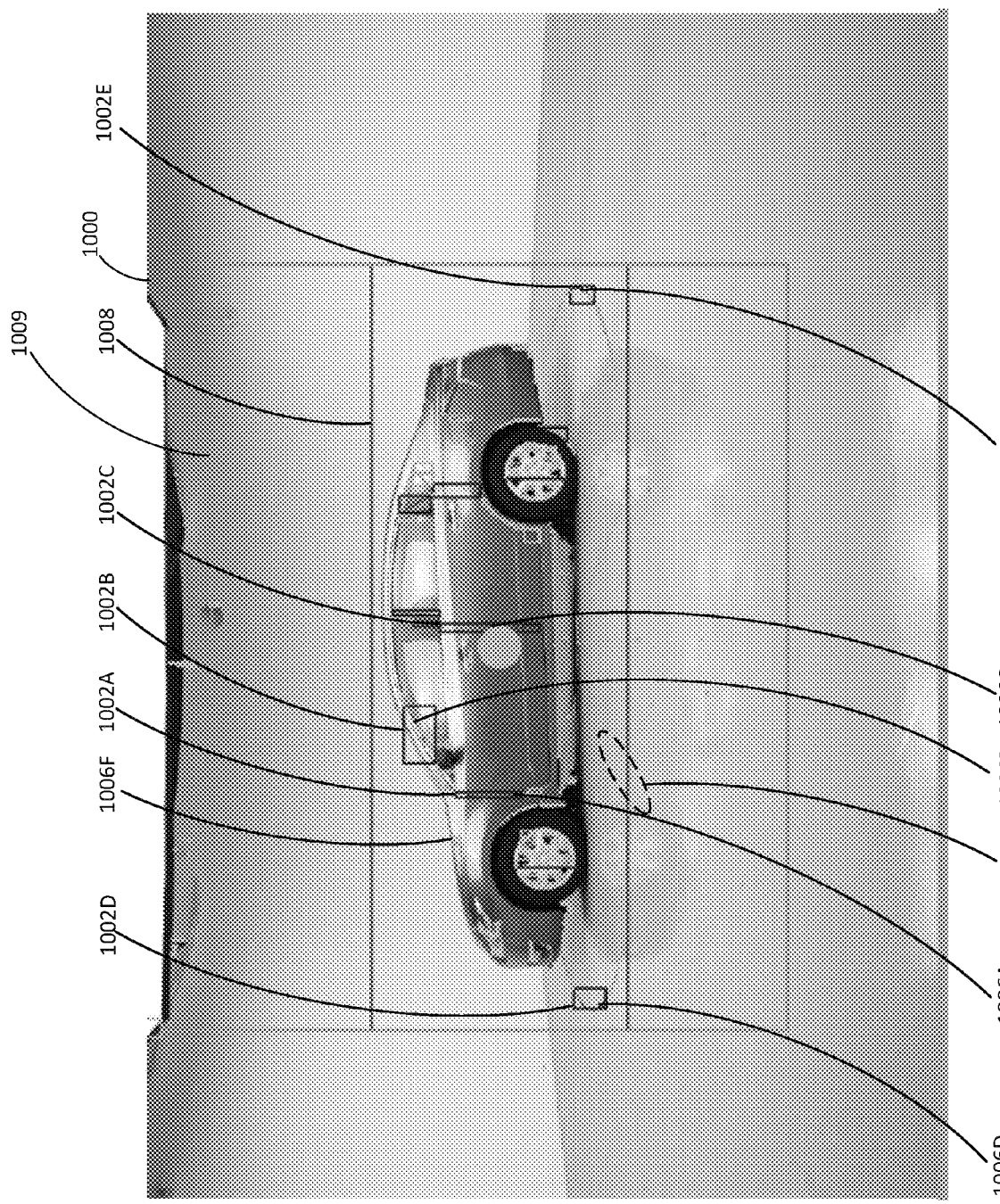
FIG. 10 shows an exemplary screenshot of the raw image shown in FIG. 8A with overlaid features from the edge image and binary image versions in accordance with an exemplary embodiment.

The system may use the contour bounding image areas of step 350 to identify one or more contour bounding image areas (e.g., contour bounding image areas 360, as shown in FIG. 8E) having user-specified dimensional criteria. The user-specified dimensional criteria may include, for example, a lower vertical dimension and an upper horizontal dimension. The use of a lower vertical dimension serves to filter out discarded contours (e.g., a discarded contour 906F, as shown in FIG. 10), which are unlikely to correlate to features of the image subject in the raw image 810 because of their small size, while the upper horizontal dimension also filters out features that are likely to correlate with the background (e.g., a studio light box) instead of the image subject of the raw image 810 because they span nearly the entire image and are too wide to correlate to a feature of the image subject.

The system may include the one or more contour bounding image areas of user-specified dimensional criteria identified in step 360 in a minimum bounded image area (e.g., a minimum bounded image area 848, as shown in FIG. 8D) at step 370 of method 300. In some embodiments, the minimum bounded image area may include a minimum bounded rectangle, which is the smallest possible rectangle that encompasses all of the contour bounding image areas. The use of a minimum bounded rectangle saves valuable computational power by reducing the complexity of the shape the system needs to analyze to determine the proper cropping area. In other embodiments, the minimum bounded image area may include a pre-padded minimum bounded rectangle that encompasses all of the contour bounding image areas and provides an additional clearance padding to ensure that no portion of the subject is inadvertently cut off.

The system may then pad the minimum bounded image area to determine a padded bounded image area (e.g., a padded bounded image area 859, as shown in FIG. 8E) having a user-specified aspect ratio in step 380 of method 300. In some embodiments, the user-specified aspect ratio may be 4:3, and in others, it may be 16:9, though other aspect ratios may be suitable depending on the eventual display method selected by the system user.

Figure 8F:
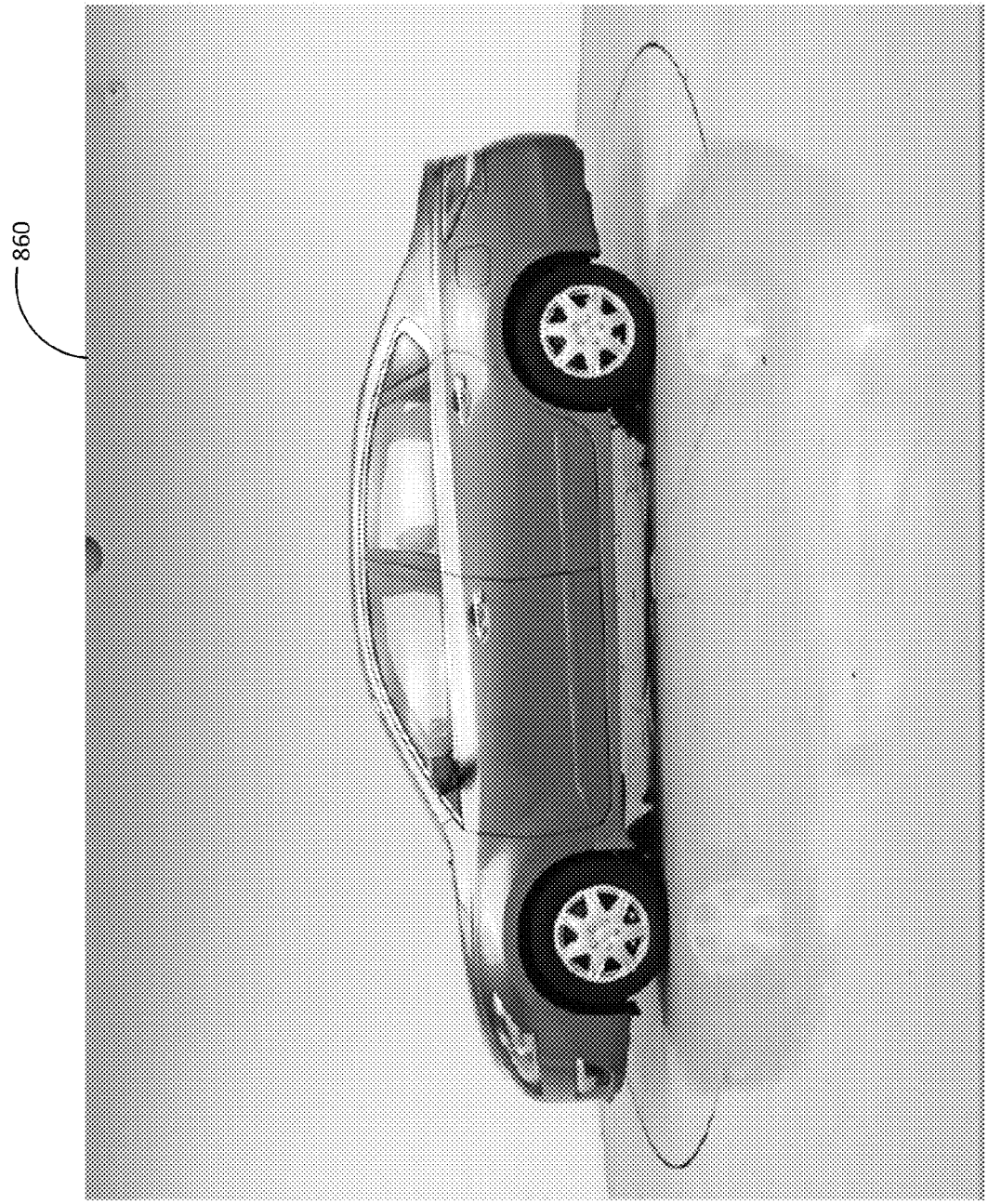

Finally, the system may crop the raw image 810 based on the padded bounded image area to produce a cropped raw image (e.g., a cropped raw image 860, as shown in FIG. 8F) of the image subject with user-specified aspect ratio at step 390 of method 300. The minimum bounded image area serves to identify the image subject by circumscribing all of the identified contour bounding image areas 842 of step 350 because the contour bounding image areas correspond to features 812 of the image subject of the raw image, and the minimum bounded image area 848 captures all these features in one area, which is then padded in one or more dimensions to achieve the proper aspect ratio before to define the padded bounded image area in the binary image. Once the padded bounded area is defined, the system may overlay the same area (e.g., with the same shape, dimensions, and relative placement between the binary image and corresponding raw image) over the raw image and crop the remainder of the raw image to produce a cropped raw image of the image subject with user-specified aspect ratio. The system may also apply similar cropping to a set of images made of a single image subject to provide a set of cropped raw images. For example, multiple images may be taken of a single vehicle in multiple orientations inside a photo studio, and each of these images may be cropped based on a cropped area determined by analysis of just one of the multiple images (e.g. vehicle side view) to yield a set of cropped raw images of a single image subject with user-specified aspect ratio. In one embodiment, sets of images of multiple vehicles may cropped by the system using image tagging. Each set of photos corresponding to a particular vehicle may be cropped according to a cropped area determined by analysis of just one of representative image (e.g. the vehicle side view) of the image set to yield a set of cropped raw images of an image subject with a user-specified aspect ratio. This method would allow for the simultaneous cropping of images of a multitude of vehicles instead of having to process the images one vehicle at a time. Similarly, in some embodiments, the system may crop a designated largest view (e.g., side view or isometric view) image of a vehicle and apply the same crop to images of other perspective views of the same or other vehicles so long as the vantage point and distance between the image capture device and the subject(s) remains constant.

Figure 4:
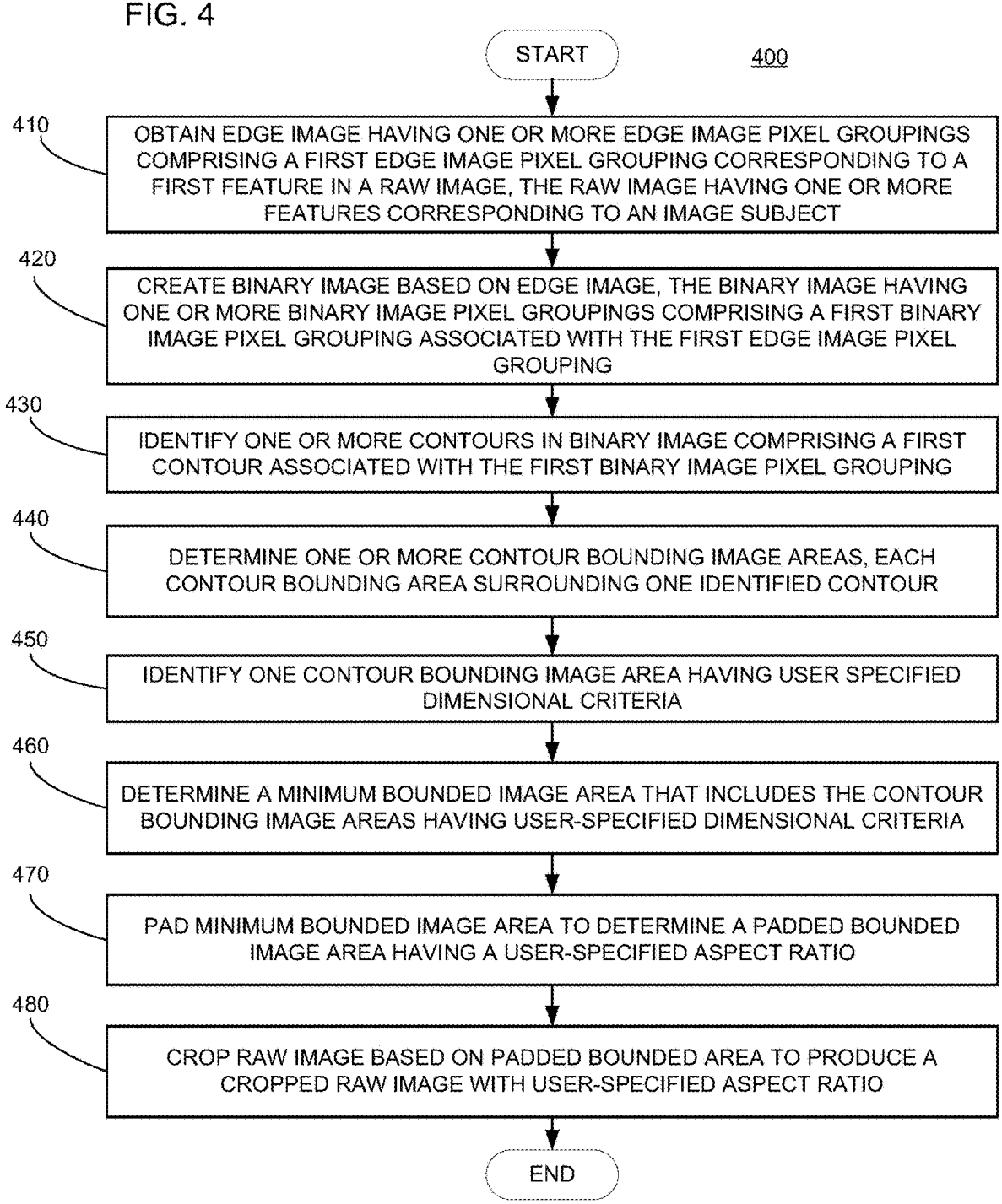
FIG. 4 is a flowchart of another exemplary method for automatic image cropping.

FIG. 4 is a flowchart of another exemplary method for automatic image cropping 400. As will be understood, method 400 may be similar to method 300 described above with respect to FIG. 3, though certain components and/or steps may be included or excluded. As shown in FIG. 4, the system (e.g. system 100) may begin with obtaining an edge image at step 410, with the edge image having one or more edge image pixel groupings including a first edge image region corresponding to a first feature in the raw image and the raw image having one or more features corresponding to an image subject. Step 410 is similar to step 320, but instead of generating the edge image from a raw image, the edge image may have previously been obtained or otherwise input into the system without having to convert a raw image into a grayscale image for generating an edge image. The system identifies pixel groupings as a collection of pixels that may include a feature corresponding to a feature of the image subject.

Based upon the edge image, the system may generate a binary image using an appropriate user-specified threshold in step 420, with the binary image having one or more binary image pixel groupings including a first binary image pixel grouping associated with the first edge image pixel grouping in the edge image. Step 420 is similar to step 330, but the binary image regions are referred to as binary image pixel groupings within method 400. A pixel grouping may represent a group of pixels comprising a region in an image. Further, step 420 identifies one or more binary image pixel groupings comprising a first binary image pixel grouping associated with a first edge image pixel grouping, whereas step 330 identifies one or more image regions associated with edge image regions. The system associates a binary pixel grouping with an edge image pixel grouping whenever the pixel groupings have the same image coordinates, and the system identifies an edge image pixel grouping corresponding to one or more features in the raw image when the edge image region contains an edge that comprises some identifying feature of the image subject (e.g. a door jamb of a car, or the spokes of its wheel).

The system may then identify the one or more contours in the binary image in step 430, with the contour(s) including a first contour associated with the first binary image pixel grouping. The binary image step 420 serves to reduce image cropping errors by strengthening the edges in the edge image, and removing weak edges 824 that fall below a user-selected threshold. A binary image comprises only two possible pixel values which may, in some embodiments, be either full intensity or an intensity of zero. Weak edges (e.g., weak edges 824 in FIG. 8B) do not typically correlate to features in the raw image (e.g., raw image 810 in FIG. 8A), and therefore their removal reduces image cropping errors. Creating the binary image in step 420 also enhances strong edges by setting their pixel value to the maximum, thereby improving the system's ability to identify image regions that correlate to features of the image subject in the raw image 810. Weak edges may represent edges in the edge image that fall below a predetermined threshold value. Their removal enhances clarity of the resultant binary image because weak edges typically do not correspond to features in the raw image (e.g. a door jamb of a car, or the spokes of its wheel) The system defines a contour as a curve comprising a boundary of a feature in an image.

The identified contours may represent contiguous pixels in a binary image, wherein each pixel that comprises the contour has the same image gradient value and therefore an equivalent image pixel intensity as each other pixel in the contour. For example, an image cropping system (e.g., system 100) may identify a curve connecting points of the same image intensity as a contour in step 430 (e.g., a contour 846, as shown in FIG. 8D). Contours may connect contiguous pixels in a binary image, with each pixel in a particular contour having the same image gradient value, and therefore an equivalent image pixel intensity as remaining pixels in the contour.

Once the one or more contours are identified, the system may determine one or more contour image bounding areas in step 440 (e.g., a contour bounding area 842, as shown in FIG. 8D), with each contour bounding area surrounding one of the one or more identified contours of 430 (e.g., a contour 846, as shown in FIG. 8D). Contour bounding image areas serve the purpose of making the determination of the image cropping area less computationally expensive. In some embodiments, the contour bounding image areas may include a minimum bounded rectangle. The use of a minimum bounded rectangle saves valuable computational power by reducing the complexity of the shape the system needs to analyze to determine the proper cropping area.

The system may further identify one of the one or more contour bounding image areas having user-specified dimensional criteria in 450 (e.g., contour bounding image areas 360, as shown in FIG. 8E). The user-specified dimensional criteria may include, for example, a lower vertical dimension and an upper horizontal dimension. The use of a lower vertical dimension serves to filter out discarded contours (e.g., a discarded contour 906F, as shown in FIG. 10), which are unlikely to correlate to features of the image subject in the raw image 810, while the upper horizontal dimension also filters out features that are likely to correlate with the background instead of the image subject of the raw image 810.

The system may determine a minimum bounded image area that includes the one or more contour bounding image areas having user-specified dimensional criteria in step 460 (e.g., a minimum bounded image area 848, as shown in FIG. 8D). In some embodiments, the minimum bounded image area 460 may include a minimum bounded rectangle. The use of a minimum bounded rectangle saves valuable computational power by reducing the complexity of the shape the system needs to analyze to determine the proper cropping area.

The minimum bounded image area may be padded to determine a padded bounded image area having a user-specified aspect ratio in 470 (e.g., a padded bounded image area 859, as shown in FIG. 8E), and the raw image may be cropped based on the padded bounded area to produce a cropped raw image of the image subject with the user-specified aspect ratio in 480 (e.g., a cropped raw image 860, as shown in FIG. 8F). The minimum bounded image area serves to identify the image subject by circumscribing all of the identified contour bounding image areas of step 450 (e.g., a contour bounding area 842, as shown in FIG. 8D) because the contour bounding image areas correspond to features of the image subject of the raw image, and the minimum bounded image area captures all these features in one area, which is padded to the proper aspect ratio before being cropped to produce a cropped raw image of the image subject with user-specified aspect ratio. Some steps of system 400 may be repeated, such as steps 410-430, to comprise, for example, a second feature in a raw image, the raw image having one or more features corresponding to an image subject 410, or a second binary image region associated with the second edge image region in the edge image 420, to identify one or more contours in the binary image comprising a second contour associated with the second binary image region 430. These steps may be repeated as many times as necessary to identify all existing contours in the binary image 430.

As noted before, the minimum bounded image area of 460 may comprise a minimum bounded rectangle. Further, the contour bounding area of 450 may also comprise a minimum bounded rectangle, and the user-specified dimensional criteria may further comprise a horizontal upper dimension and a vertical lower dimension. The use of a lower vertical dimension serves to filter out discarded contours (e.g., a discarded contour 906F, as shown in FIG. 10) which are unlikely to correlate to features of the image subject in the raw image (e.g., raw image 810 in FIG. 8A), while the upper horizontal dimension also filters out features that are likely to correlate with the background instead of the image subject of the raw image 810. In some embodiments, the user-specified aspect ratio may be 4:3, and in others, it may be 16:9, though other aspect ratios may be suitable depending on the eventual display method selected by the system user.

Figure 5:
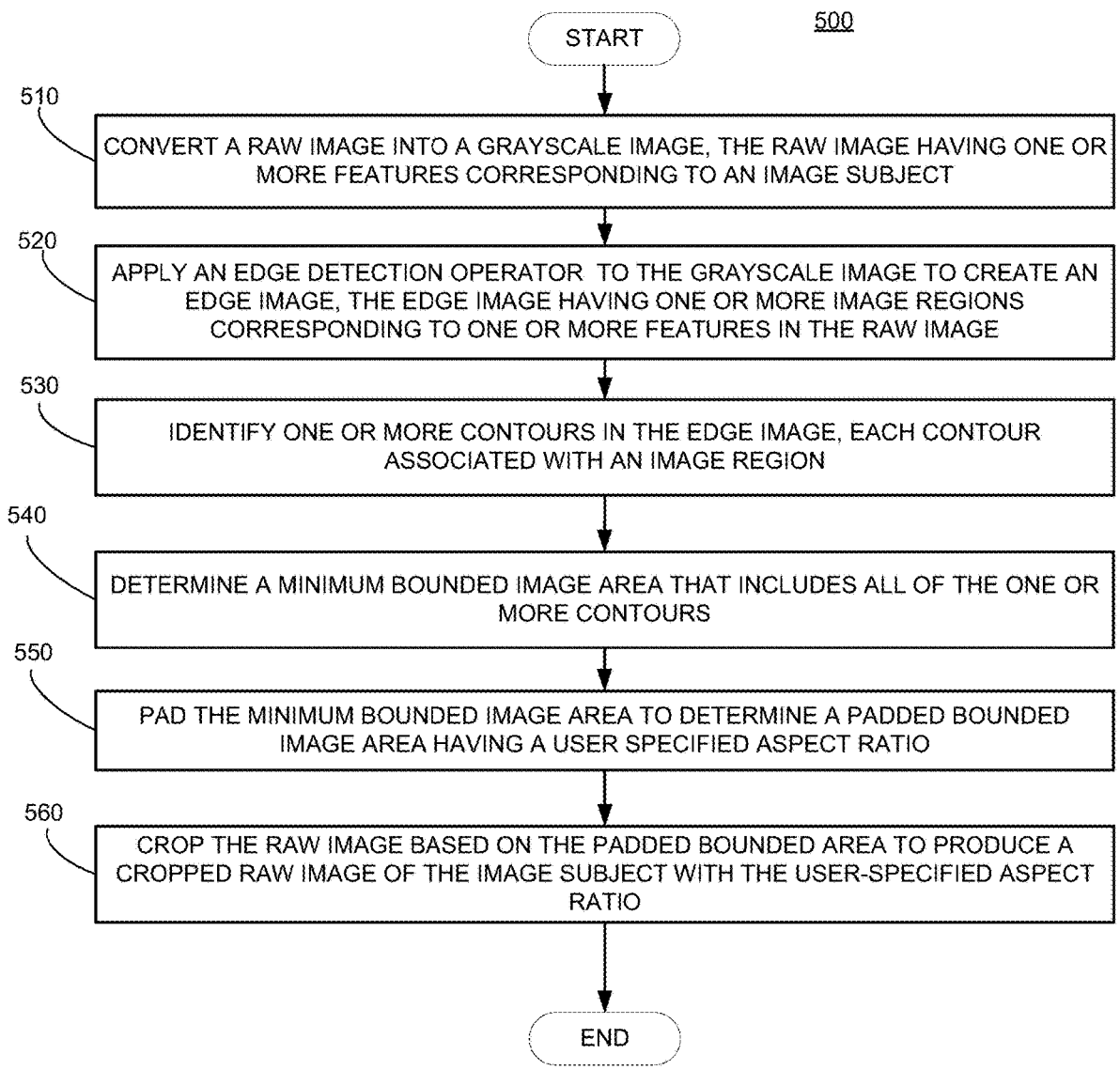
FIG. 5 is a flowchart for a further exemplary method for automatic image cropping.

FIG. 5 is a flowchart of a further exemplary method for automatic image cropping. As will be understood, method 500 is similar to method 300 described above, though certain components have been excluded from the example, such as the binary image step. Instead, method 500 uses the edge image directly to identify contours, contour bounding image areas, and the like. The system may convert a raw image into a grayscale image in 510, the raw image having one or more feature corresponding to an image subject. This step may be performed either by the user terminal first node 130 or by the server terminal central node 120, after image capture device 140 transmits the captured raw image (e.g., raw image 810 in FIG. 8A) to either the server terminal 120 or the user terminal 130. The processor (e.g., processor 210 in FIG. 2) may process the image to convert the raw image 810 into a grayscale image (e.g., a grayscale image 820 in FIG. 8B). A grayscale image may be obtained from a raw image using a basic three-step process. The system measures the red, green, and blue values of each pixel in the raw image. Next, the values of the red, green, and blue pixels may be averaged to obtain a gray value, which may be used to replace the original red, green, and blue, values found in the raw image. This is just one method of obtaining a grayscale image, and other methods are contemplated by this disclosure. For example, instead of a simple average of green, blue, and red pixel values, a weighted average of red, green, and blue pixel values correcting for how the human eye sees colors may be used instead. Other methods of obtaining a grayscale image from a raw input image such decomposition and desaturation are also contemplated.

The system may further transform the grayscale image 820 into an edge image 830 using an edge detection algorithm, again utilizing either the processor 210 of the user terminal 130 or the server terminal 120 to create an edge image in step 520. The system may use the Sobel edge detector to transform grayscale image 820 into edge image 830. The edge image 830 may contain edge image regions corresponding to one or more features in the raw image 810. The edge image regions comprise features corresponding to the image subject of the raw image 810. The edge image may have one or more image regions corresponding to one or more features in the raw image of 510.

In step 530, the system may identify one or more contours in the edge image, with each contour associated with an image region. The system defines a contour as a curve comprising a boundary of a feature in an image. The contours of 530 may connect contiguous pixels in an edge image, wherein each pixel that comprises the contour has substantially the same image gradient value and therefore a similar image pixel intensity as each other pixel in the contour. For example, an image cropping system (e.g., system 100) may identify a curve connecting points of the similar image intensity as a contour.

A minimum bounded image area that includes all of the one or more contours may be determined in 540, wherein the minimum bounded image area may include a minimum bounded rectangle. The use of a minimum bounded rectangle saves valuable computational power by reducing the complexity of the shape the system needs to analyze to determine the proper cropping area. The minimum bounded image area serves to identify the image subject by circumscribing all of the identified contour bounding image areas of step 540 because the contour bounding image areas correspond to features of the image subject of the raw image, and the minimum bounded image area captures all these features in one area.

The minimum bounded image area may be padded to determine a padded bounded image area having a user specified aspect ratio in 550. In some embodiments, the user-specified aspect ratio may be 4:3, and in others, it may be 16:9, though other aspect ratios may be suitable depending on the eventual display method selected by the system user. The system may further include cropping the raw image based on the padded bounded area of 550, to produce a cropped raw image of the image subject with the user specified aspect ratio in 560.

Figure 6:
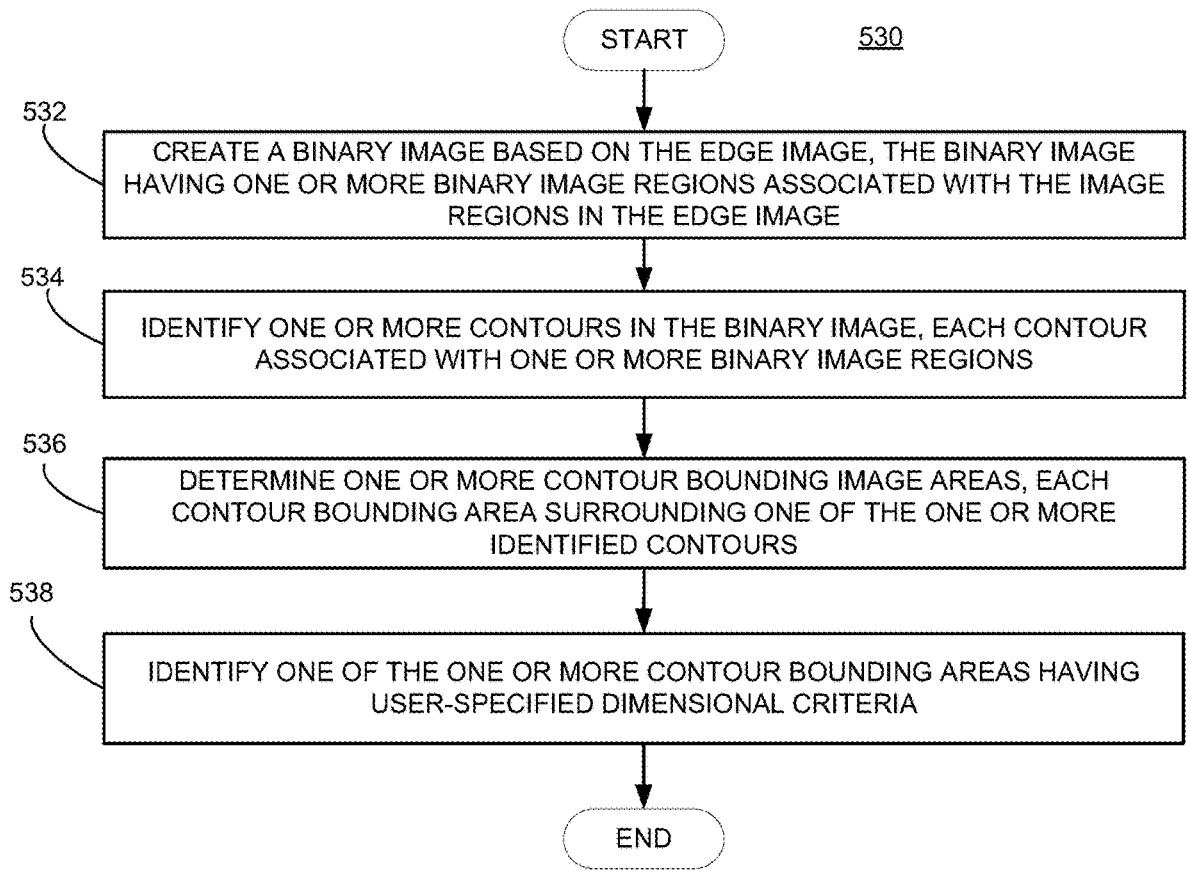
FIG. 6 is a flowchart for an exemplary method of identifying contours in an edge image.

FIG. 6 is a flowchart of an exemplary method of identifying contours in an edge image. In step 532, the system 100 may create a binary image based on the edge image, wherein the binary image may have one or more binary image regions associated with the image regions in the edge image of steps 520-530 from FIG. 5. The binary image step serves to reduce image cropping errors by strengthening the edges in the edge image, and removing weak edges 824 that fall below a user-selected threshold. A binary image comprises only two possible pixel values which may be either full intensity or an intensity of zero. Weak edges may represent edges in the edge image that fall below a predetermined threshold value. Their removal enhances clarity of the resultant binary image because weak edges typically do not correspond to features in the raw image (e.g. a door jamb of a car, or the spokes of its wheel). Weak edges 824 do not typically correlate to features in the raw image 810, and therefore their removal reduces image cropping errors. The binary image step 532 also enhances strong edges by setting their pixel value to the maximum, thereby improving the system's ability to identify image regions that correlate to features of the image subject in the raw image 810.

One or more contours may be identified in the binary image in step 534, wherein each contour may be associated with one or more binary image regions of steps 520-530 from FIG. 5.

One or more contour bounding image areas may be determined in 536 wherein each contour bounding area may surround one of the one or more identified contours of 534. Contour bounding image areas (e.g., a contour bounding area 842, as shown in FIG. 8D) serve the purpose of making the determination of the image cropping area less computationally expensive. In some embodiments, the contour bounding image areas may include a minimum bounded rectangle. The use of a minimum bounded rectangle saves valuable computational power by reducing the complexity of the shape the system needs to analyze to determine the proper cropping area.

In step 538, the system may identify one of the one or more contour bounding image areas having user-specified criteria. The user-specified criteria may comprise, without limitation, an upper horizontal dimension and a lower vertical dimension. The use of a lower vertical dimension serves to filter out discarded contours (e.g. a discarded contour 906F, as shown in FIG. 10) which are unlikely to correlate to features of the image subject in the raw image (e.g., a captured raw image 810 as shown in FIG. 8A), while the upper horizontal dimension also filters out features that are likely to correlate with the background instead of the image subject of the raw image.

Figure 7:
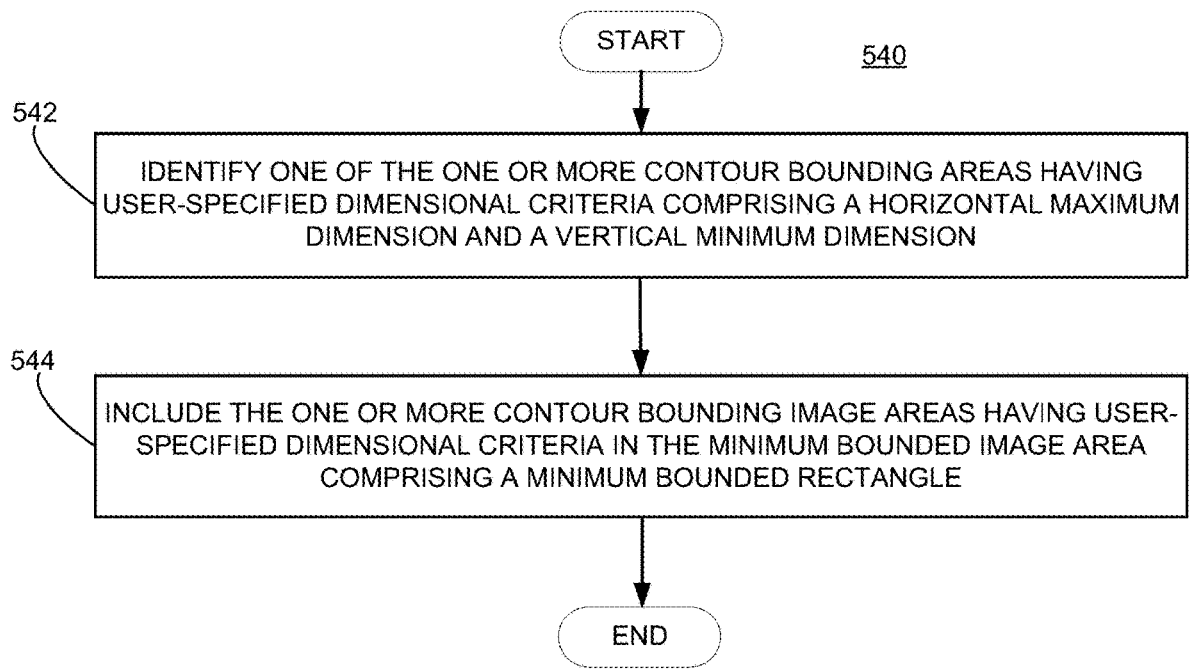
FIG. 7 is a flowchart for an exemplary method for determining a minimum bounded image area.

FIG. 7 is a flowchart for an exemplary method for determining a minimum bounded image area. In 542, the system 100 may identify the one or more contour bounding image areas having user-specified dimensional criteria in determining the minimum bounded image area. Contour bounding image areas 842 serve the purpose of making the determination of the image cropping area less computationally expensive. The user-specified dimensional criteria may comprise a maximum horizontal dimension and a minimum vertical dimension for the purpose of eliminating noise artifacts from the image. Contour bounding image areas that are larger than the maximum horizontal dimension may be considered noise artifacts related to the background instead of the image subject; likewise, contour bounding image areas that are smaller than the minimum vertical dimension may be characterized as noise objects that do not correlate to one or more features in the raw image, and therefore may be excluded from steps 542-544.

In step 544, the one or more contour bounding image areas having user-specified dimensional criteria may be included in the minimum bounded image area. In some implementations, the minimum bounded image area may comprise a minimum bounded rectangle. The use of a minimum bounded rectangle saves valuable computational power by reducing the complexity of the shape the system needs to analyze to determine the proper cropping area. A minimum bounded image area may take any shape, but in some implementations a minimum bounded image area may be advantageous because of the simplicity of its calculation and therefore its ease of implementation without excess use of processing power of computing system 200 of FIG. 2.

FIGS. 8A-8F show exemplary screenshots of various versions of a raw image, shown in FIG. 8A, as the system performs the autocropping method in accordance with an exemplary embodiment. FIGS. 9A-F show matching line drawings of the exemplary screenshots shown in FIGS. 8A-8F for illustrative purposes.

Figure 9A:
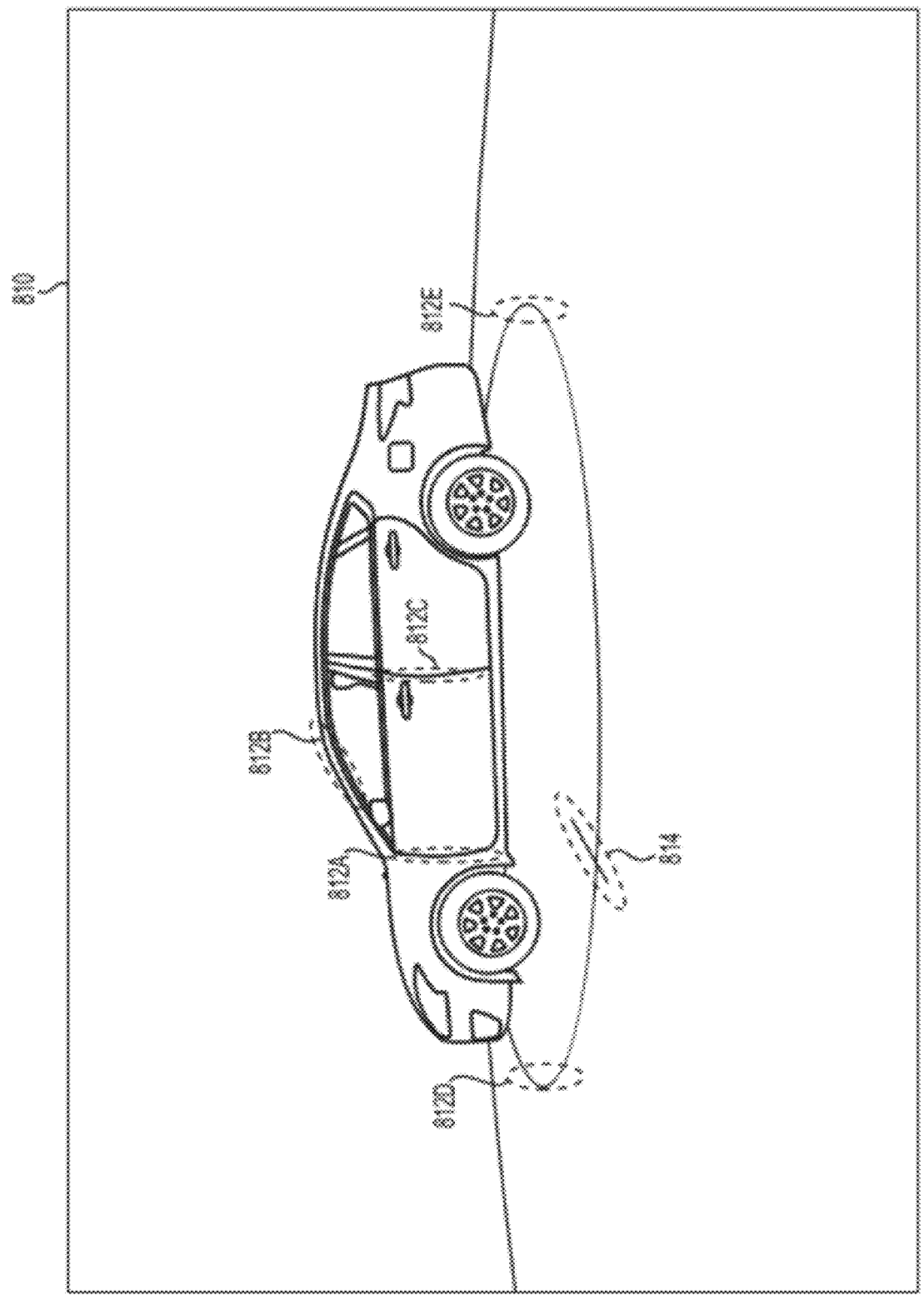

FIGS. 8A and 9A represent a raw image according to an exemplary embodiment of the disclosed technology. The raw image 810 has image features 812 and 814. Image features 812 represent features that have a sufficiently strong edge in the edge detection step of, for example, method 300, that they will be enhanced by the binary image step and kept as binary image features. Weak edges (e.g., weak edge 814 as shown in FIG. 8A) will be removed in the binary image step of method 300.

Figure 9B:
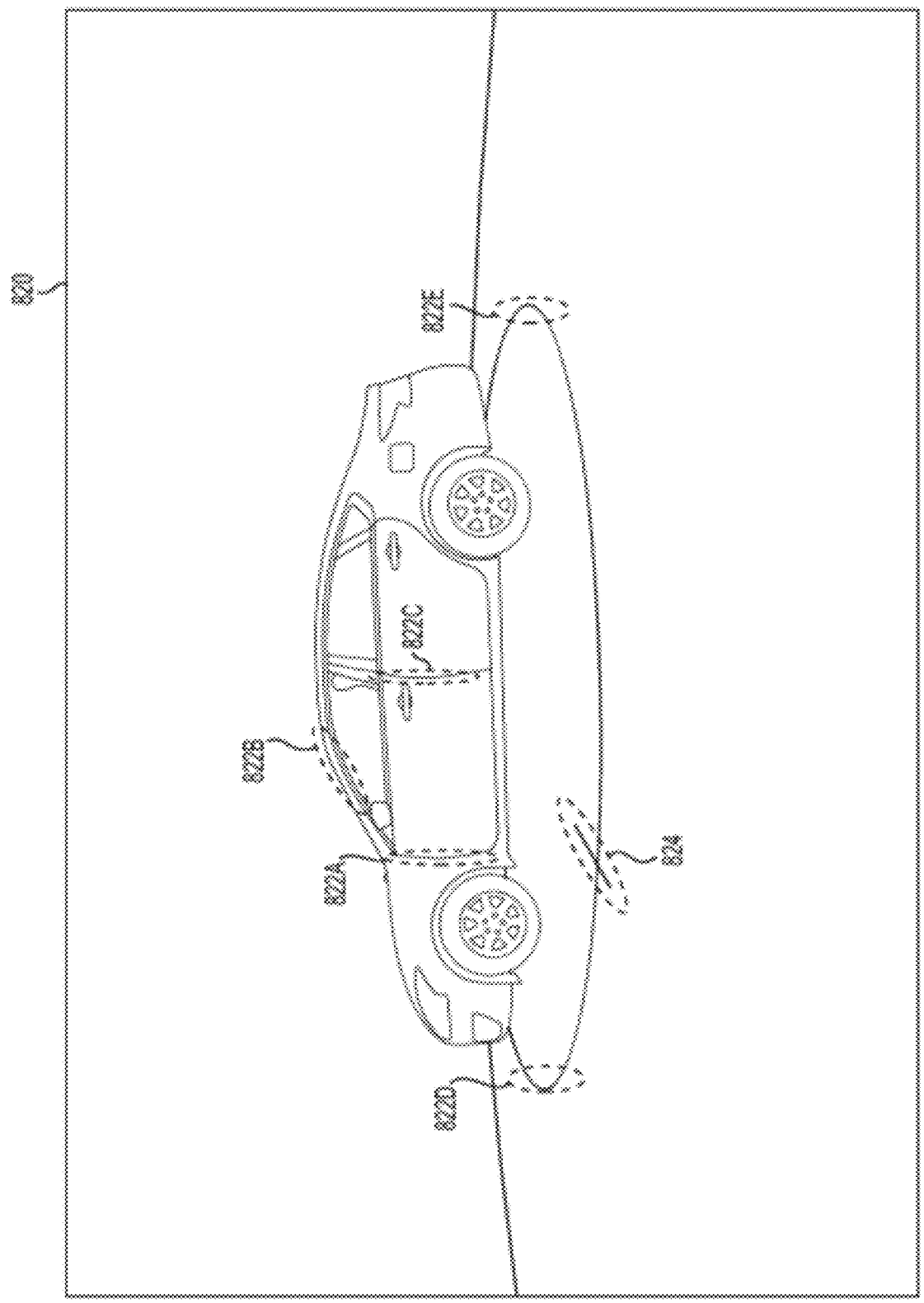

FIGS. 8B and 9B show a grayscale image according to an exemplary embodiment of the disclosed technology. Grayscale image 820 contains grayscale image features 822 that correspond to features in the raw image 812. Grayscale image feature 824 corresponds to raw image feature 814, which will yield a weak edge 834 in the edge image 830 and will be removed by the binary step of, for example, method 300, resulting in a removed weak edge 844 in the binary image 840. For example, grayscale image 820 may result from applying a grayscale operation to raw image 810, as described in exemplary embodiments with reference to method 300 and method 400 above.

Figure 9C:
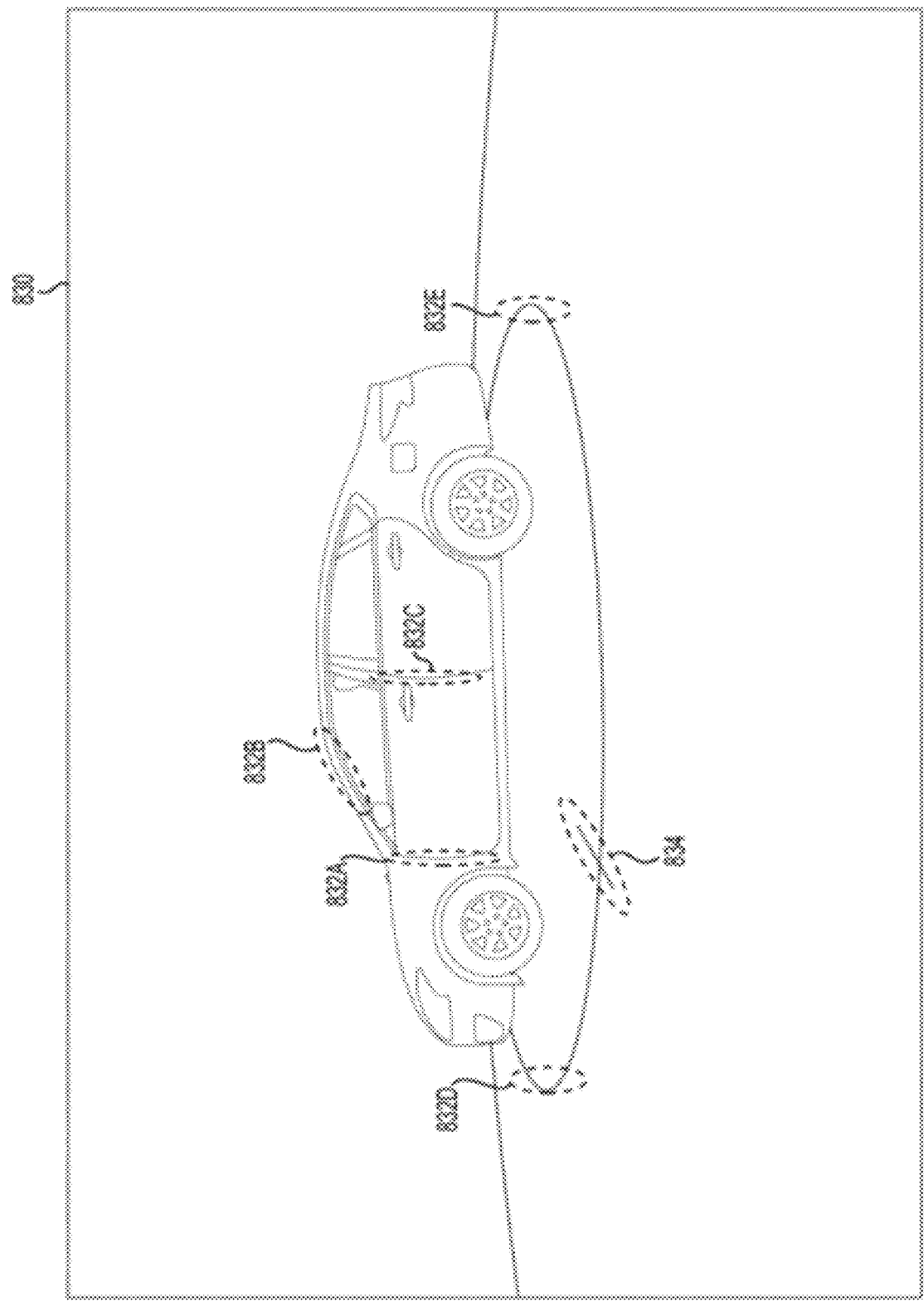

FIGS. 8C and 9C represent the edge image 830 version of the raw image 810. Edge image 830 has edge image regions 832 which correspond to one or more features 812 in the raw image 810. The edge image regions 832 comprise features corresponding to the image subject of the raw image 810, which may be according to an exemplary embodiment of the disclosed technology (e.g., method 300). Edge image 830 also contains weak edge image regions 834 corresponding to weak features 814 in the raw image 810, which will be removed by the binary step of method 300 yield discarded edges 844 in the binary image 840 (as shown in FIG. 8D).

Figure 9D:
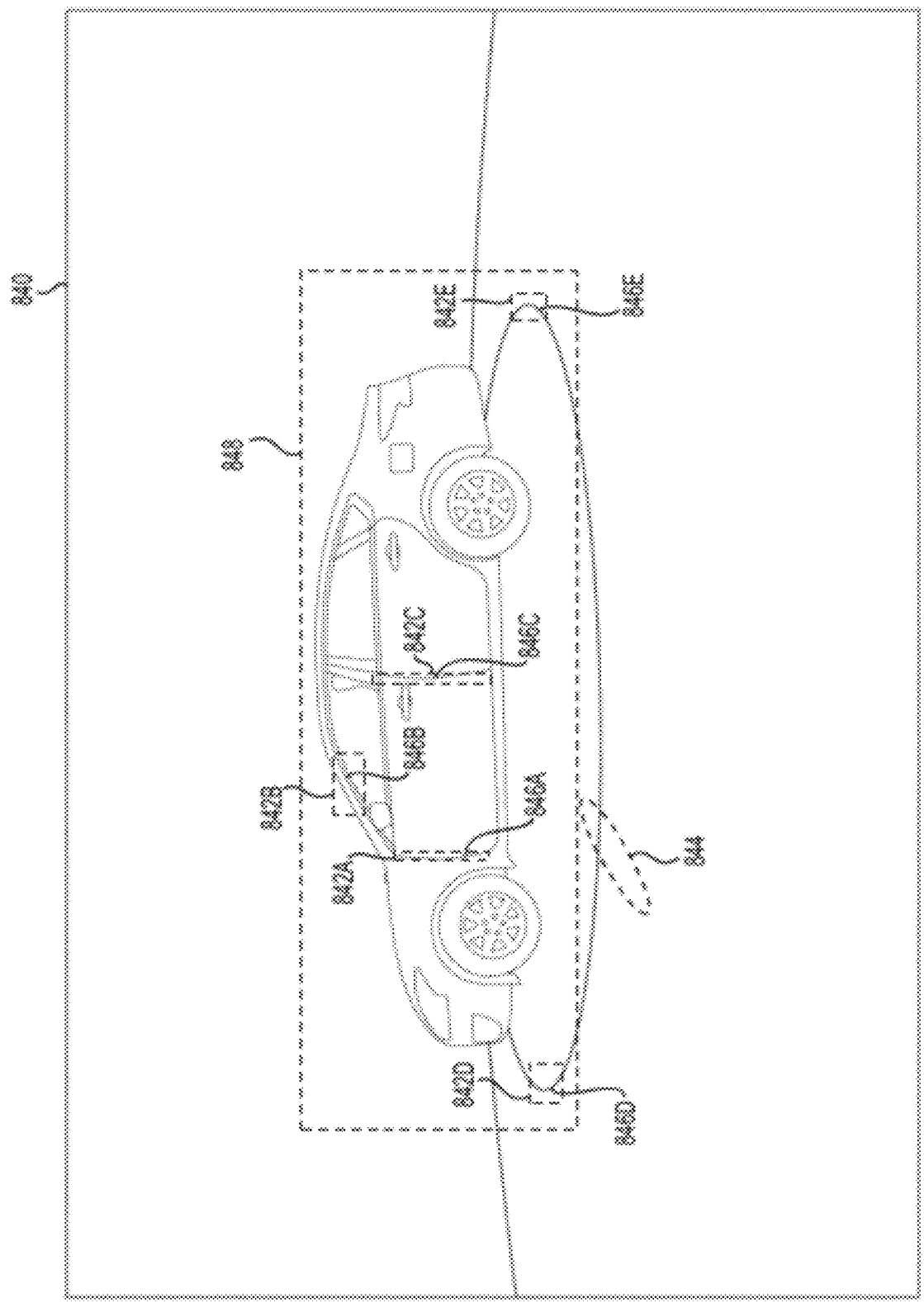

FIGS. 8D and 9D show a binary image 840 version of the raw image 810 obtained according to an exemplary embodiment of the disclosed technology (e.g., method 300). Binary image 840 contains contours 846 bound by contour binding image regions of user-specified dimensional criteria 842. A minimum bounding image area 848 is determined by circumscribing all the contour binding image areas of user-specified dimensional criteria. The discarded weak edges 844 are discarded by the binary image step of, e.g., method 300 and are not used in determining contour bounding image areas 842.

Figure 9E:
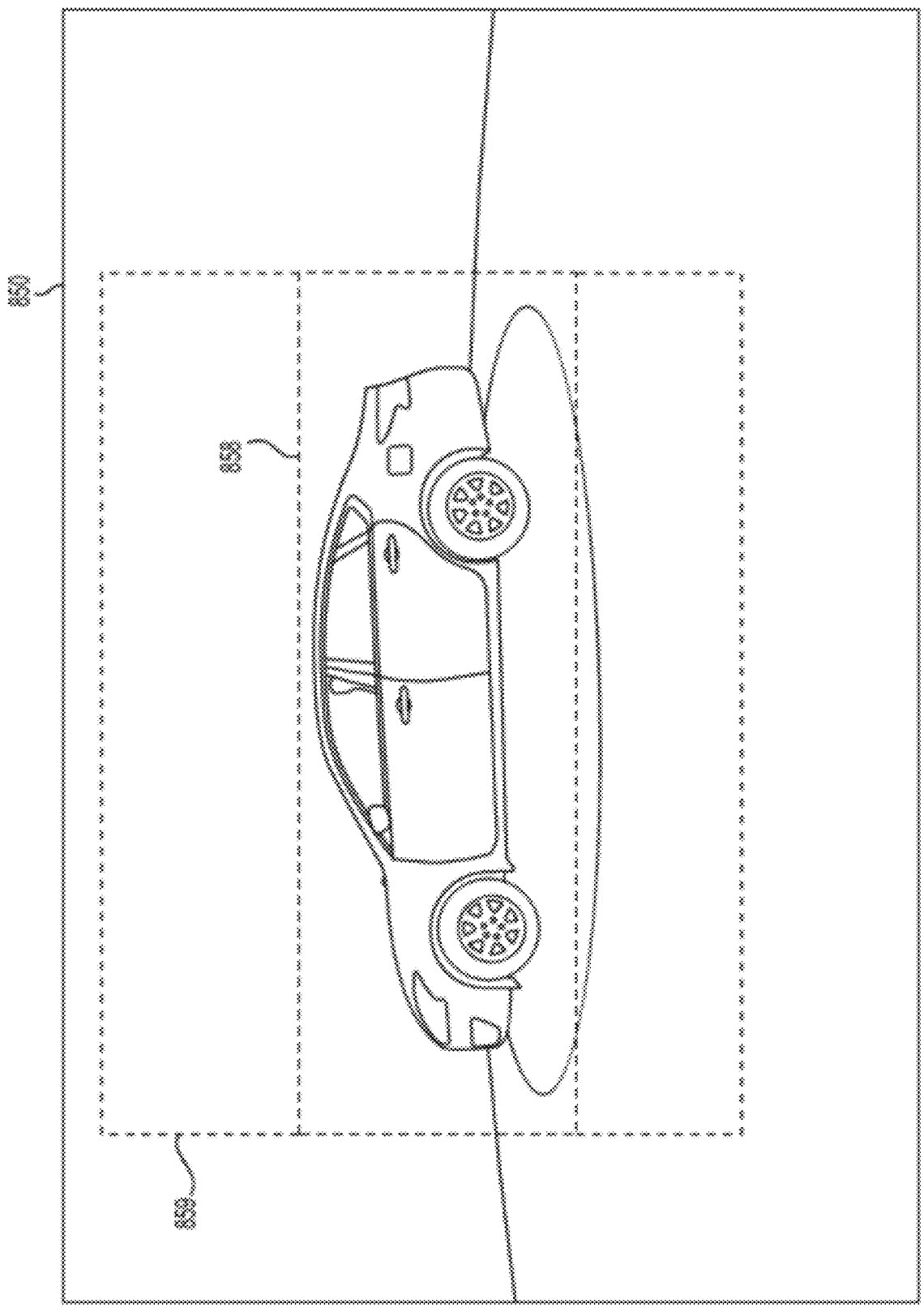

FIGS. 8E and 9E show a raw image 850 according to an exemplary embodiment of the disclosed technology. Raw image 850 contains the minimum bounding image area 858 and a padded region fit user-specified aspect ratio 859. The raw image 850 is cropped according to the padded bounded image area 859 to produce a resultant image in FIG. 8F.

Figure 9F:
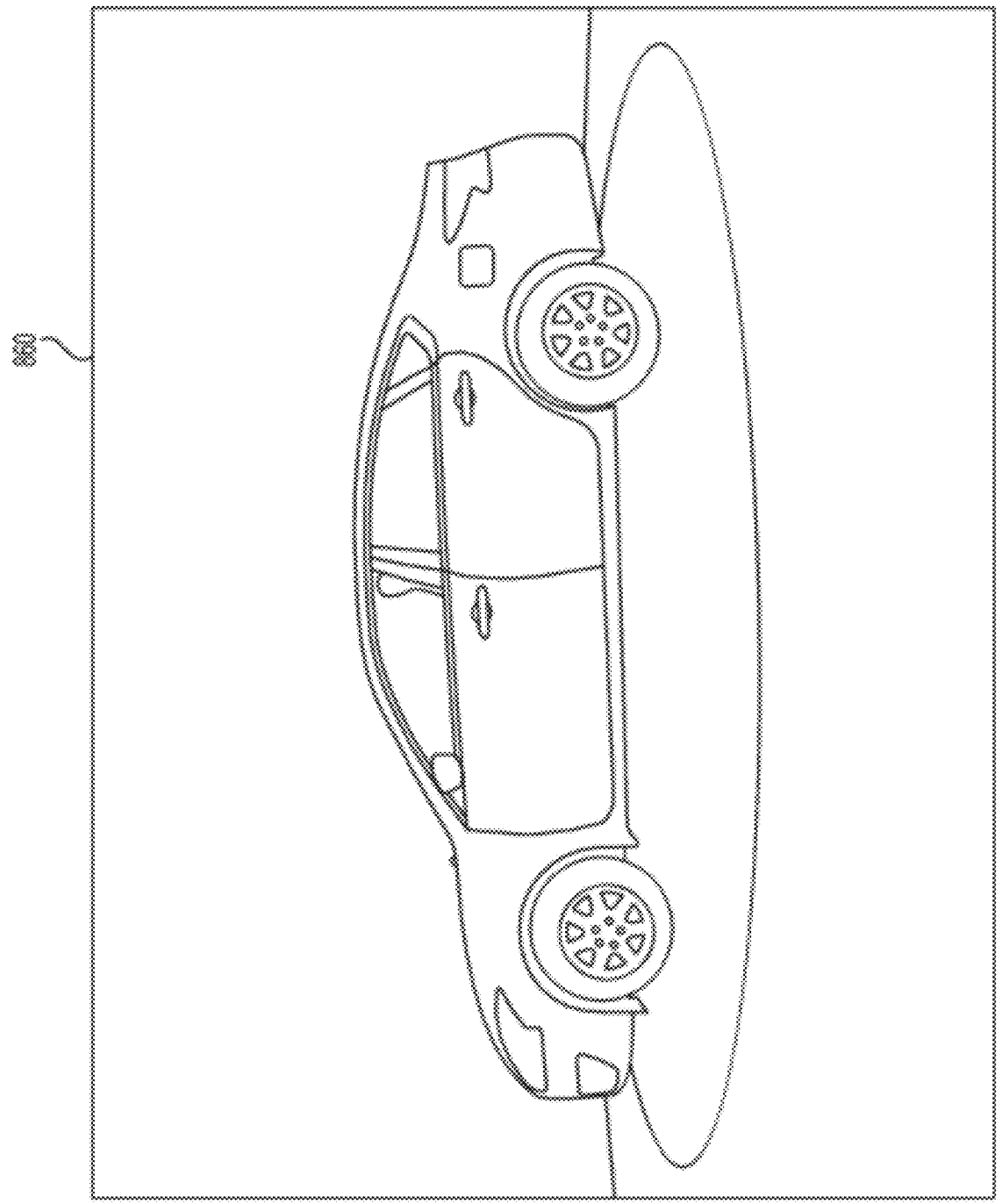

FIGS. 8F and 9F show a cropped raw image of user-specified aspect ratio 860 according to an exemplary embodiment of the disclosed technology.

FIGS. 8A-8F and 9A-9F illustrate the process by which the contour bounding image areas and minimum bounded image area are determined. The system 100 may transform raw image 810 into a grayscale image 820 by step 310, for example.

The system may transform the grayscale image 820 into an edge image 830 using an edge detection algorithm, such as, but not limited to, the Sobel edge detector. According to an exemplary embodiment of the disclosed technology, an image region may be considered to be a grouping of contiguous image pixels.

The system may further transform edge image 830 into a binary image 840. The binary image may contain binary objects surrounded by contours, which may be defined by contiguous points joining pixels of the same image intensity value, and the binary image regions may correlate to features found in the raw input image. Further, the method 300 may create a binary image 840 based on the edge image 830 utilizing, for example processor 210 of either the user terminal 130 or the server terminal 120. The binary image 840 may have one or more binary image regions 842 associated with the edge image regions 832 in the edge image 830, the edge regions corresponding to one or more features 812 in the raw image 810. The binary image step serves to reduce image cropping errors by strengthening the edges in the edge image, and removing weak edges 844 that fall below a user-selected threshold. A binary image comprises a set of pixels with each respective pixel having one of two possible pixel values which may be either full intensity or an intensity of zero. Weak edges do not typically correlate to features in the raw image 810, and therefore their removal reduces image cropping errors. The binary image step also enhances strong edges by setting their pixel value to the maximum, thereby improving the system's ability to identify image regions that correlate to features of the image subject in the raw image 810. Finally, the system may use the binary image 840 to determine a cropped raw image containing the image subject as in the resultant image 860.

FIG. 10 shows an exemplary screenshot of the raw image shown in FIG. 8A with overlaid features from the edge image and binary image versions shown in FIGS. 8C-8D, in accordance with an exemplary embodiment. In exemplary screenshot of the raw image 1000 the minimum bounded image 1008 may be determined by circumscribing all the contour bounding image areas of user-specified dimensional criteria 1002, which circumscribe the image contours 1006. In some embodiments, as shown in FIG. 10, the minimum bounded image 1008 may include a thin pixel padding to ensure the entire image subject is captured. In other embodiments, the minimum bounded image 1008 may abut edges of one or more image contours 1006. Discarded contour bounding image areas 1006F may be discarded because they do not meet the user-specified dimensional criteria, which may include a vertical lower dimension and horizontal upper dimension. The system 100 may crop the raw image 810 based on a padded minimum bounded image area 1009 to produce a cropped raw image of the image subject with user-specified aspect ratio (e.g., cropped raw image 860 of FIG. 8F).

The automated image cropping system of the disclosed technology may be useful in a retail operation with a plurality of distributed nodes that receive goods for sale, and communicate information regarding those goods. For example, in a network of automobile dealerships, various dealer locations will receive new automobile inventory through trade-ins, purchases from customers, or wholesale purchases. A dealer location may be responsible for intaking information about a particular automobile purchased by the dealership. In addition to capturing the vehicle's information (e.g., make, model, year, condition, etc.), the dealership may be responsible for taking a series of photos that represent that automobile for eventual distribution to a larger network, such as through the dealership's website. It is advantageous for such photos to appear similar in appearance for display to potential customers through the website, for example. However, ensuring consistency in the quality and appearance of the photos is difficult to manage manually by human operators. The automated image cropping system of the disclosed technology can assist with increasing the consistency of photos for eventual display for example, by choosing the clearest photo of a plurality of photos taken of the same image subject. The chosen picture will have the lowest levels of glare and blurriness, for example. In addition, the automated cropping system and method created an improved dealership network that operates more efficiently and improves overall processing by creating modified, cropped images at the dealer location (e.g., remote nodes), which further reduces the network load of transferring full raw images to the central hub of the dealer network for processing, manual cropping, and eventual upload to the dealer network. The disclosed method and system reduce network strain and create an overall improved system. In another aspect of this invention, the system may extract certain desirable features of an image subject to be merchandised on a separate website; for example, the portion of an image containing a vehicle's wheels could be extracted from an image subject for separate merchandising.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An automatic image cropping system comprising:
one or more processors; and
a memory in communication with the one or more processors and storing instructions that, when executed by the one or more processors, are configured to cause the system to:
convert a raw image into a grayscale image, the raw image having one or more features corresponding to an image subject;
apply an edge detection operator to the grayscale image to create an edge image, the edge image having one or more edge image regions corresponding to the one or more features in the raw image;
create a binary image based on the edge image, the binary image having one or more binary image regions associated with the one or more edge image regions in the edge image;
identify one or more contours in the binary image, each contour associated with a respective one of the one or more binary image regions;
determine one or more contour bounding image areas, each contour bounding area surrounding one of the one or more identified contours;
identify at least one of the one or more contour bounding image areas having user-specified dimensional criteria;
determine a minimum bounded image area that includes the one or more contour bounding image areas having user-specified dimensional criteria, wherein the minimum bounded image area surrounds the one or more contour bounding image areas having the user-specified dimensional criteria and the minimum bounded image area defines a region corresponding to the image subject, and the user-specified dimensional criteria comprises a maximum horizontal dimension and a minimum vertical dimension;
pad the minimum bounded image area by identifying one or more pixels bordering at least a portion of the minimum bounded image area to determine a padded bounded image area having a user-specified aspect ratio; and
crop the raw image based on the padded bounded area to produce a cropped raw image of the image subject with the user-specified aspect ratio.

2. The system of claim 1 wherein applying an edge detection operator further comprises applying a Sobel edge operator.

3. The system of claim 1 wherein the minimum bounded image area further comprises a minimum bounded rectangle.

4. The system of claim 1 wherein the one or more contour bounding image areas further comprise a minimum bounded rectangle.

5. An automatic image cropping system comprising:
a first node of a plurality of nodes;
a central node of the plurality of nodes, the central node being in communication with the first node;
one or more processors; and
a memory in communication with the one or more processors and storing instructions that, when executed by the one or more processors, are configured to cause the system to:
obtain, at the first node, an edge image having one or more edge image pixel groupings comprising a first edge image pixel grouping corresponding to a first feature in a raw image, the raw image having one or more features corresponding to an image subject;
create, at the first node, a binary image based on the edge image, the binary image having one or more binary image pixel groupings comprising a first binary image pixel grouping associated with the first edge image pixel grouping in the edge image;
identify, at the first node, one or more contours in the binary image comprising a first contour associated with the first binary image pixel grouping;
determine, at the first node, one or more contour bounding image areas, each contour bounding area surrounding one of the one or more identified contours;
identify, at the first node, one of the one or more contour bounding image areas having user-specified dimensional criteria;
determine, at the first node, a minimum bounded image area that (i) contains the one or more contour bounding image areas having user-specified dimensional criteria comprising a maximum horizontal dimension and a minimum vertical dimension and (ii) corresponds with a region associated with the image subject;
pad, at the first node, the minimum bounded image area by identifying one or more pixels bordering at least a portion of the minimum bounded image area to determine a padded bounded image area having a user-specified aspect ratio;
crop, at the first node, the raw image based on the padded bounded area to produce a cropped raw image of the image subject with the user-specified aspect ratio; and
transmit, from the first node, the cropped raw image to the central node.

6. The system of claim 5, wherein the one or more edge image pixel groupings further comprises:
a second edge image pixel grouping corresponding to a second feature in the raw image;
the one or more binary image pixel groupings further comprises a second binary image pixel grouping associated with the second edge image pixel grouping in the edge image; and
the one or more contours further comprises a second contour associated with the second binary image pixel grouping.

7. The system of claim 6, wherein obtaining the edge image further comprises:
converting a raw image into a grayscale image; and
applying an edge detection operator to the grayscale image to create an edge image.

8. The system of claim 6 wherein the minimum bounded image area further comprises a minimum bounded rectangle.

9. The system of claim 6 wherein the one or more contour bounding image areas further comprise a minimum bounded rectangle.

10. The system of claim 7 wherein the edge detection operator further a Sobel edge operator.

11. An automatic image cropping system comprising:
one or more processors; and
a memory in communication with the one or more processors and storing instructions that, when executed by the one or more processors, are configured to cause the system to:
convert a raw image into a grayscale image, the raw image having one or more features corresponding to an image subject;

apply an edge detection operator to the grayscale image to create an edge image, the edge image having one or more image regions corresponding to one or more features in the raw image;

identify one or more contours in the edge image, each contour associated with an image region;

determine a minimum bounded image area that (i) surrounds at least one of the one or more contours that resides within a maximum horizontal dimension and a minimum vertical dimension and (ii) defines a region corresponding with the image subject;

pad the minimum bounded image area by identifying one or more pixels bordering at least a portion of the minimum bounded image area to determine a padded bounded image area having a user-specified aspect ratio; and crop the raw image based on the padded bounded area to produce a cropped raw image of the image subject with the user-specified aspect ratio.

12. The system of claim 11, wherein identifying one or more contours in the edge image further comprises:

creating a binary image based on the edge image, the binary image having one or more binary image regions associated with the image regions in the edge image;

identifying one or more contours in the binary image, each contour associated with the binary image region.

13. The system of claim 12, wherein identifying one or more contours in the binary image further comprises:

determining one or more contour bounding image areas, each contour bounding area surrounding one of the one or more identified contours; and identifying one of the one or more contour bounding image areas having user-specified dimensional criteria.

14. The system of claim 13 wherein determining a minimum bounded image area further comprises including the one or more contour bounding image areas having user-specified dimensional criteria.

15. The system of claim 14 wherein applying the edge detection operator further comprises applying a Sobel edge operator.

16. The system of claim 14 wherein the minimum bounded image area further comprises a minimum bounded rectangle.

17. The system of claim 14 wherein the image subject comprises a motor vehicle.

18. The system of claim 1, wherein the instructions, when executed by the one or more processors, are configured to cause the system to discard zero or more contour bounding image areas not having user-specified dimensional criteria.

19. The system of claim 5, wherein the instructions, when executed by the one or more processors, are configured to cause the system to:

identify one or more contour bounding image areas not having user-specified dimensional criteria; and discard the identified one or more bounding image areas not having the user-specified dimensional criteria.

20. The system of claim 11, wherein the instructions, when executed by the one or more processors, are configured to cause the system to:

identify a first set of the one or more contours that reside within the maximum horizontal dimension and the minimum vertical dimension, the minimum bounded image area surrounding the first set of the one or more contours;

identify a second set of the one or more contours that reside outside of the maximum horizontal dimension and the minimum vertical dimension; and discard the second set of the one or more contour bounding image areas not having user-specified dimensional criteria.

* * * * *